United States Patent
Seth

(10) Patent No.: US 12,332,364 B2
(45) Date of Patent: Jun. 17, 2025

(54) GEOSPATIAL OPERATING SYSTEM AND METHOD

(71) Applicant: Rohit Seth, Ontario (CA)

(72) Inventor: Rohit Seth, Ontario (CA)

( * ) Notice: Subject to any disclaimer, the term of this patent is extended or adjusted under 35 U.S.C. 154(b) by 255 days.

(21) Appl. No.: 17/843,923

(22) Filed: Jun. 17, 2022

(65) Prior Publication Data
US 2022/0390622 A1 Dec. 8, 2022

Related U.S. Application Data

(63) Continuation of application No. PCT/IB2020/001067, filed on Dec. 21, 2020.

(60) Provisional application No. 62/952,187, filed on Dec. 20, 2019.

(51) Int. Cl.
*H04W 64/00* (2009.01)
*G01S 19/47* (2010.01)

(52) U.S. Cl.
CPC ............ *G01S 19/47* (2013.01); *H04W 64/006* (2013.01)

(58) Field of Classification Search
CPC ..... G01S 19/47; H04W 64/006; H04W 64/00; H04W 84/18; G01C 21/165
See application file for complete search history.

(56) References Cited

U.S. PATENT DOCUMENTS

| | | | | |
|---|---|---|---|---|
| 6,496,778 B1 * | 12/2002 | Lin | ...................... | G01S 19/55 |
| | | | | 701/472 |
| 11,639,981 B2 * | 5/2023 | Wu | ...................... | H04W 4/021 |
| | | | | 342/28 |
| 2003/0120425 A1 * | 6/2003 | Stanley | ................ | G01C 21/165 |
| | | | | 701/500 |
| 2007/0118286 A1 * | 5/2007 | Wang | ...................... | G01S 19/47 |
| | | | | 342/357.65 |
| 2013/0222115 A1 * | 8/2013 | Davoodi | .................. | H04Q 9/00 |
| | | | | 340/10.1 |

FOREIGN PATENT DOCUMENTS

| CA | 3050639 A1 | 7/2018 |
|---|---|---|
| EP | 3243190 A1 | 11/2017 |

OTHER PUBLICATIONS

International Search Report and Written Opinion corresponding to the International Application No. PCT/IB2020/001067 dated Apr. 16, 2021.

* cited by examiner

*Primary Examiner* — Kenneth T Lam
(74) *Attorney, Agent, or Firm* — Morgan, Lewis & Bockius LLP

(57) ABSTRACT

A method of determining locations of devices in a peer-to-peer network includes, at a first device, performing an intrinsic location measurement using a plurality of inertial measurement units of the first device and broadcasting to other devices first location information of the first device based on the intrinsic location measurement. The method further includes, at a second device, receiving the first location measurement information of the first device from the first device, receiving second location measurement information of the first device from a third device, and comparing the first and second location information of the first device. Based on whether the first and second location information match, the method includes, at the second device, adjusting a trust factor for the first device and broadcasting the adjusted trust factor and consensus location information of the first device.

20 Claims, 19 Drawing Sheets

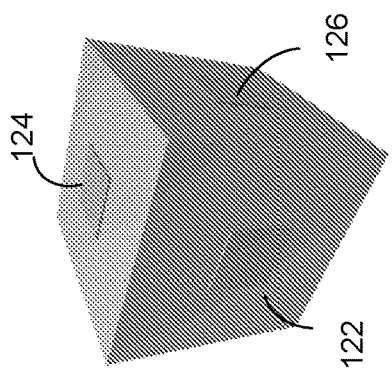
Figure 1E
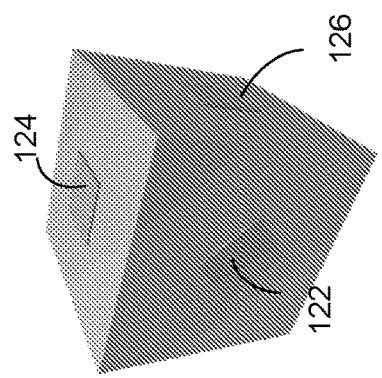
Figure 1F
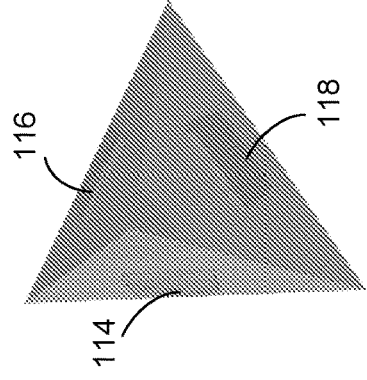
Figure 1C
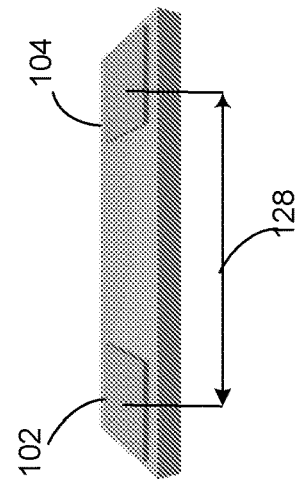
Figure 1A
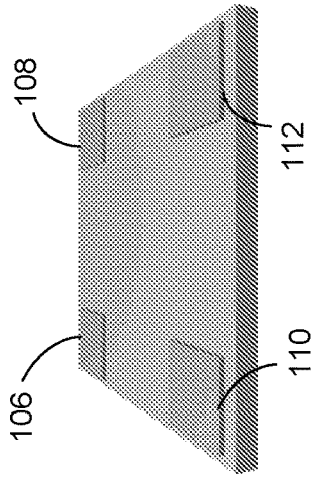
Figure 1D
Figure 1B

GEOSPATIAL OPERATING SYSTEM AND METHOD

CROSS-REFERENCE TO RELATED APPLICATIONS

This application is a bypass continuation of PCT Patent Application Serial No. PCT/IB2020/001067, filed on Dec. 21, 2020, which claims the benefit of and priority to U.S. Provisional Patent Application 62/952,187 filed on Dec. 20, 2019, each of which is incorporated herein by reference in its entirety.

This application is related to U.S. Pat. No. 9,417,693, entitled "Wearable Wireless HMI Device" and filed on Dec. 8, 2015; U.S. Pat. No. 9,846,482, entitled "Wearable Wireless HMI Device" and filed on Aug. 15, 2016; U.S. Patent Application Publication No. 2018/0101231, entitled "Wearable Wireless HMI Device" and filed on Dec. 11, 2017 and U.S. Provisional Application No. 62/690,865 filed on Jun. 27, 2018. The entire contents of these references are incorporated by reference in their entireties.

TECHNICAL FIELD

The disclosed implementations relate generally to motion sensors and more specifically to a method, system, and device for implementing motions sensors with drift correction, in some implementations, capable of position tracking, more accurate than the Global Positioning System (GPS), and independent of external reference markers, transponders, or satellites.

BACKGROUND

Motion tracking detects the precise position and location of an object by recognizing rotation (pitch, yaw, and roll) and translational movements of the object. Inertial tracking is a type of motion tracking that uses data from sensors (e.g., accelerometers, gyroscopes, magnetometers, altimeters, and pressure sensors) mounted on an object to measure positional changes of the object. Some of the sensors are inertial sensors that rely on dead reckoning to operate. Dead reckoning is the process of calculating an object's current location by using a previously determined position, and advancing that position based upon known or estimated accelerations, speeds, or displacements over elapsed time and course. While dead reckoning techniques are somewhat effective, they are subject to cumulative error called "drift" Because some IMUs estimate relative position/location by integrating acceleration data twice from an accelerometer, even a small error in acceleration results in compounded, increasing, error in relative position/location that accumulates over time. Similarly, errors in gyroscopic angular velocity data lead to cumulative error in relative angular orientation. Thus, acceleration and gyroscopic data are unreliable, when used in isolation, to estimate orientation and positional changes of an object being tracked using IMUs.

Traditional solutions that compensate for drift without eliminating it, are too costly and/or unreliable. One such solution merges external reference data, such as from a camera or a GPS, with the data from an IMU mounted on an object being tracked to reset the drift of the IMU data at defined intervals. Fusing IMU data with a GPS signal typically results in a large error margin (e.g., several meters). Other solutions fuse data from multiple IMUs, using a Kalman filter, and weighted averaging to try and reduce orientation-drift using statistical calculations over a large sample or number of IMU sensors with differential measurement techniques. When multiple sensors are used, even if a few of the sensors are obstructed, orientation tracking becomes increasingly unreliable. Location tracking remains unsolved even with the best, current drift-compensation techniques employing multiple sensors with weighted statistical calculations. Furthermore, a very large number of sensors is required to significantly reduce overall drift in a multi-sensor system. More sensors also mean higher cost, greater combined power consumption, and increased latency in sampling and processing of orientation data. Increased latency causes low sampling rates further leading to positional error and a reduction in positional accuracy.

Spatiotemporal data relates to both space and time. Only the largest tech companies in the world have centralized access to spatiotemporal data, providing competitive advantages and insights that few companies or governments can rival. GEOS aims to level the playing field for everyone else.

As an example, leveraging their scale and reach, some large tech companies can identify every individual in their respective ecosystems along with their location, behaviors, and preferences. These large tech companies convert that information into massive economic power, placing themselves as centralized powerbrokers of intimate personal data warehousing capable of competing at the level of governments. Due to their first-mover advantage and scale, no other company, let alone an individual can afford to remove themselves from these ecosystems or negotiate to own their information—and the price of access may be the forfeiture of privacy and ownership.

Outside of large tech companies, data marketplaces are notoriously fraudulent and opaque. Privacy laws and regulations have added layers to the complexity of location data and its numerous applications.

Positioning systems may be inaccurate, easy to spoof or fake, and limited to mostly outdoor use. Automotive navigation may be interrupted in tunnels and parking lots and subject to "blind spots" in random areas. Indoor maps of buildings and malls may rely on technologies that are inaccurate and insecure—resulting in the production of erroneous location data.

SUMMARY

Accordingly, there is a need for systems and/or devices for implementing cost-effective, high accuracy, high-speed motion sensors that correct for drift. The present disclosure describes an improved intrinsic motion measurement technology based on a new paradigm of IMU sensors, opening the door to otherwise inaccessible realms of Proof of Location (PoL) solutions. These IMU sensors do not suffer from drift, allowing high-density, millimeter-level, measurements in movement. Further, these IMU sensors do not depend on any external signal to measure motion and provide long-term sustained accuracy and precision output of motion data. One of the significant benefits of PoL generated by localized motion sensing technology provided by these IMU sensors is that the signals from these IMU sensors cannot be spoofed. Spoofing is the primary vulnerability that can lead to 51% attacks for radio based devices using telemetric techniques, where a false radio signal can be generated to fool a network of nodes.

In one aspect, a method of determining locations of devices in a peer-to-peer network includes, at a first device (Dx) in the peer-to-peer network: performing an intrinsic location measurement (i) using a plurality of inertial measurement units (IMUs) of the first device and (ii) independent of data obtained from devices in the peer-to-peer network other than the first device; and broadcasting to one or more devices (Dy, A, B, C) in the peer-to-peer network first location information of the first device (L2) based on the intrinsic location measurement.

The method further includes, at a second device (Dy) in the peer-to-peer network: receiving from the first device (Dx) in the peer-to-peer network the first location information (L2) of the first device (Dx); receiving from a third device (Dz) in the peer-to-peer network second location information (L6) of the first device (Dx), the second location information (L6) of the first device (Dx) having been determined by the third device (Dz) based on location information (L4) received from at least one device (A, C) in the peer-to-peer network other than the first device (Dx); and comparing the first location information (L2) of the first device (Dx) with the second location information (L6) of the first device (Dx).

In accordance with a determination that the first location information (L2) of the first device (Dx) matches the second location information (L6) of the first device (Dx), the method includes, at the second device (Dy): increasing a trust factor (Tx) associated with the first device (Dx); and broadcasting to one or more devices (Dz, A, B) in the peer-to-peer network (i) the increased trust factor (Tx) associated with the first device (Dx), and (ii) consensus location information (L8) of the first device (Dx) based on the first location information (L2) of the first device (Dx).

In accordance with a determination that the first location information (L2) of the first device (Dx) does not match the second location information (L6) of the first device (Dx), the method includes, at the second device (Dy): decreasing a trust factor (Tx) associated with the first device (Dx); and broadcasting to one or more devices (Dz, A, B) in the peer-to-peer network (ii) the decreased trust factor (Tx) associated with the first device (Dx), and (ii) consensus location information (L8) of the first device based on the second location information (L6) of the first device (Dx).

Performing the intrinsic location measurement at the first device may include: determining a first device initial absolute position for the plurality of IMUs; sensing, using the plurality of IMUs, motion of the first device and generating sensed motion data of the first device; generating, using a controller of the first device, a motion signal representative of the motion of the first device, including calculating a rectified data output based on sensed motion data from each of the plurality of IMUs, a predetermined position of each of the plurality of IMUs, and a predetermined orientation of each of the plurality of IMUs; and determining, using the controller, the intrinsic location measurement based on the motion signal generated by the controller and the first device initial absolute position.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

FIGS. 1A-1F illustrate various configurations of motion sensors mounted on two-dimensional ("2-D") or three-dimensional ("3-D") objects, in accordance with some implementations.

DESCRIPTION OF IMPLEMENTATIONS

Figure 2:
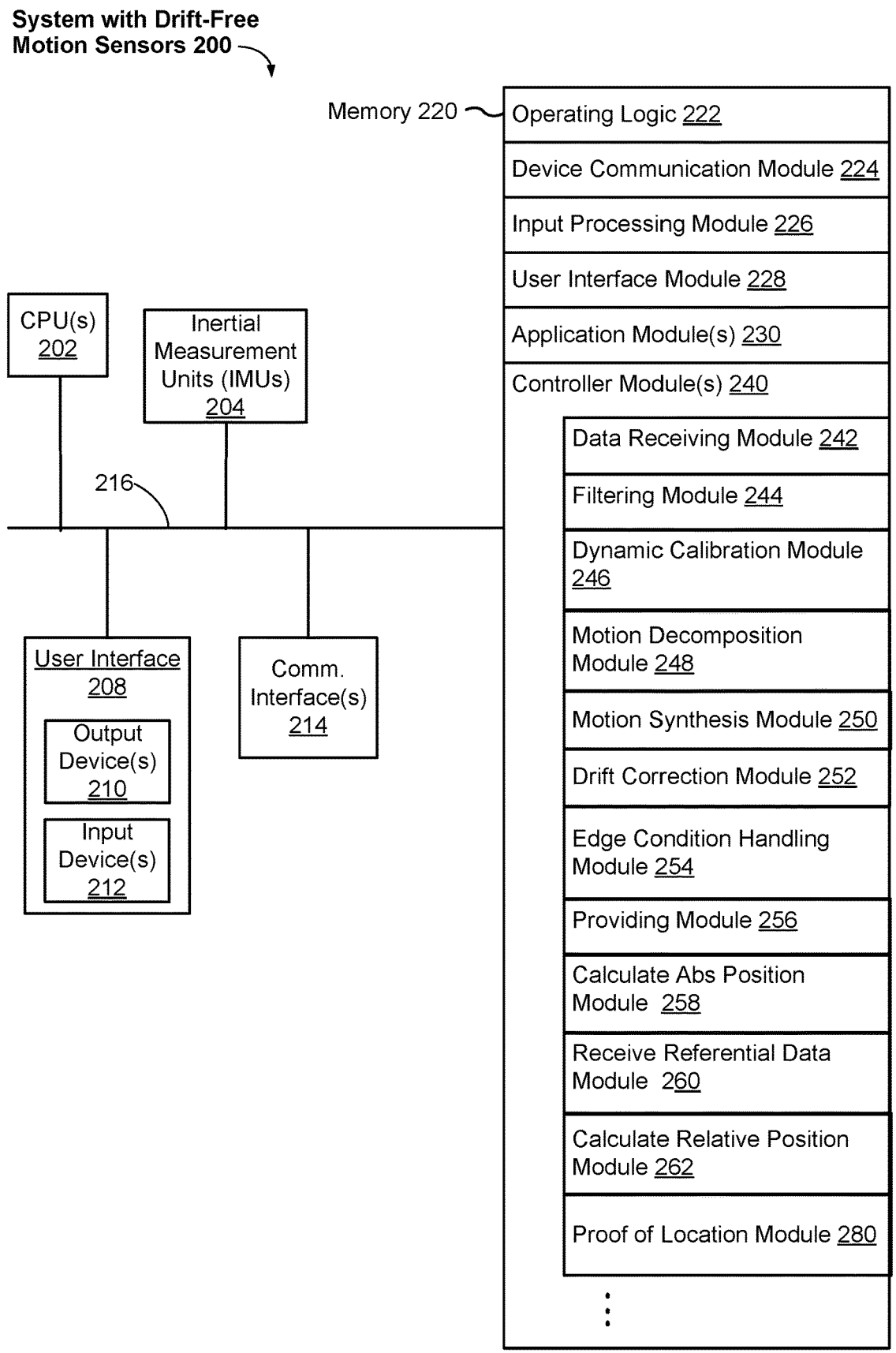
FIG. 2 is a block diagram illustrating a representative system with sensor(s) with drift correction, according to some implementations.

Described herein are exemplary implementations for systems, methods and/or devices for implementing cost-effective, high accuracy, high-speed motion sensors that correct for drift. There are a number of different applications for motion sensors that correct for drift, including, but not limited to, gaming systems, smartphones, helmet-mounted displays, military applications, and gesture tracking devices, among others. For example, in U.S. Pat. No. 9,417,693 (the "'693 patent"), incorporated herein by reference in its entirety, different implementations for a wearable wireless human-machine interface (HMI) are described. In the '693 patent, a user can control a controllable device based on gestures performed by the user using the wearable HMI. In some implementations, a controller to track motion and correct for drift, as described herein, may be connected to the IMUs of the wearable HMI. In some implementations, the controller is attached to or integrated in the wearable HMI. In some implementations, the controller is remote from the wearable HMI but communicatively coupled to the wearable HMI.

FIGS. 1A-1F illustrate various configurations of motion sensors mounted on 3D objects, in accordance with some implementations. Motion sensors may be mounted in linear arrays, on planar surfaces, or vertices of a myriad of geometric configurations, formed by any dimensional planar surface, platonic solid, or irregular 3D object. As long as the distances and angles are known between the mounted motion sensors, drift can be eliminated by, among certain methods or portions thereof described herein, resetting the motion sensors' instantaneous measured acceleration, angular velocity, magnetic orientation, and altitude to match the known geometry formed by the physical distances and angles of the motion sensors relative to each other, as further described below in reference to flowcharts 4A-4D below.

In a linear geometry, as shown in FIG. 1A, two sensors 102, 104 are positioned adjacent to each other at a fixed distance 128, and the angles between the two sensors can be considered to be approximately 0 degrees or approximately 180 degrees. As the measured distance or angle between the two fixed sensors 102 and 104, at any given instantaneous reading, deviates from the known distance 128, or angle between them, this drift can be removed and positions of the two motion sensors can be reset to a fairly accurate degree.

A planar configuration of three (3) or four (4) or more sensors can provide a spatial calculation based on a higher number of IMU readings of instantaneous measurements of all sensors in the array with known physical angles and distances between them. FIG. 1B shows a four-sensor configuration with sensors 106, 108, 110, and 112 mounted adjacent to each other in a planar configuration. Planar configurations, such as the configurations shown in FIGS. 1A and 1B, provide a simpler mathematical model with fairly low demand for computation. However, variations in axial motion detection methods of the physical sensors may affect the accuracy of measurement in different axes of motion and orientation. For example, motion in the Z-axis of a MEMS-based sensor is heavily biased with a gravity vector which may introduce higher variance in the physical motion of the sensor in this axis. Additionally, the coriolis force, used to calculate Yaw in the z-axis, is also susceptible to larger variance than the X, or Y axis.

For improved drift correction, a tetrahedron configuration with four (4) sensors, each one mounted on each face of the tetrahedron can provide a blend of multi-axial data resulting in better complementary and compensatory measurement for the gravity vector bias than a single, Z-Axis of all sensors, according to some implementations. FIGS. 1C and 1D show one such configuration. FIG. 1C shows the top—oblique view of a tetrahedron with motion sensors 114, 116, 118 mounted on each of the visible three faces. FIG. 1D shows the bottom—oblique view of the tetrahedron shown in FIG. 1C showing the additional sensor 120 on the fourth face of the tetrahedron. In this configuration, a component of the X and Y axis is also exposed to the gravity vector from at least three sensors at any given time, permitting a higher degree of accuracy through the removal of the gravity vector from a number of sensors and a number of axes at any instantaneous measurement. Sensors are mounted at angles on each surface, providing a blend of X, Y, and Z axis data for better spatial calculations and drift correction, in accordance with some implementations.

Furthermore, a cubic configuration will provide a higher sensor count of six (6) sensors on the six (6) surfaces of the cube to stabilize the spatial deviation even further. FIG. 1E shows an oblique view of a cubic configuration, according to some implementations. Only three out of the six faces are visible in FIG. 1E. Each of the six faces may have a sensor mounted, including the sensors 122, 124, and 126. In some implementations, some, less than all, faces of any object described herein have at least one sensor. In this configuration, each sensor on each face enables a complementary reading between the other sensors on the other faces of the cube. However, as the number of sensors is increased, the latency to read all measurements is also increased in the cubic or higher dimensional solid geometries.

Motion sensors can also be rotated on opposite faces of the geometric solids to provide an axial blend in any configuration, according to some implementations. FIG. 1F shows an oblique view of another configuration of the cuboid in FIG. 1E wherein motion sensors are mounted on each face of the cube as before, but sensors may be rotated at an angle between zero (0) and ninety (90) degrees, non-inclusive. For example, sensor 122 may be rotated at an angle of approximately forty-five (45) degrees with respect to the other sensors. Although this method may provide a better analysis of instantaneous motion data, the computation time per measurement-to-calculation output may be longer.

FIG. 2 is a block diagram illustrating a representative system 200 with drift-free sensor(s), according to some implementations. In some implementations, the system 200 includes one or more processing units 202 (e.g., CPUs, ASICs, FPGAs, microprocessors, and the like), one or more communication interfaces 214, memory 220, and one or more communication buses 216 for interconnecting these components (sometimes called a chipset). The type of processing units 202 is chosen to match the requirement of application, including power requirements, according to some implementations. For example, the speed of the CPU should be sufficient to match application throughput.

In some implementations, the system 200 includes a user interface 208. In some implementations, the user interface 208 includes one or more output devices 210 that enable presentation of media content, including one or more speakers and/or one or more visual displays. In some implementations, user interface 208 also includes one or more input devices 212, including user interface components that facilitate user input such as a keyboard, a mouse, a voice-command input unit or microphone, a touch screen display, a touch-sensitive input pad, a gesture capturing device, or other input buttons or controls. Furthermore, some systems use a microphone and voice recognition or a camera and gesture recognition or a motion device and gesture recognition to supplement or replace the keyboard.

In some implementations, the system 200 includes one or more Inertial Measurement Unit(s) 204. In some implementations, the IMUs include one or more accelerometers, one or more magnetometers, and/or one or more gyroscopes, and/or altimeters, and/or pressure sensors. In some implementations, the one or more IMUs are mounted on an object that incorporates the system 200 according to a predetermined shape. FIGS. 1A-1F described above illustrate various exemplary configurations of motion sensors. In some implementations, the initial configuration of the IMUs (e.g., the number of IMUs, the predetermined shape) is also determined based on characteristics of the individual IMUs. For example, the orientation or the axis of the IMUs, and therefore the predetermined shape, are chosen so as to compensate for manufacturing defects. In some implementations, the one or more IMUs are fabricated as CMOS and MEMS system on a chip (SOC) that incorporates the system 200.

Communication interfaces 214 include, for example, hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

Memory 220 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, one or more EPROMs, one or more EEPROMs, or one or more other non-volatile solid state storage devices. Memory 220, or alternatively the non-volatile memory within memory 220, includes a non-transitory computer readable storage medium. In some implementations, memory 220, or the non-transitory computer readable storage medium of memory 220, stores the following programs, modules, and data structures, or a subset or superset thereof:

- operating logic 222 including procedures for handling various basic system services and for performing hardware dependent tasks;
- device communication module 224 for connecting to and communicating with other network devices (e.g., network interface, such as a router that provides Internet connectivity, networked storage devices, network routing devices, server system, etc.) connected to one or more networks via one or more communication interfaces 214 (wired or wireless);
- input processing module 226 for detecting one or more user inputs or interactions from the one or more input devices 212 and interpreting the detected inputs or interactions;
- user interface module 228 for providing and displaying a user interface in which settings, captured data, and/or other data for one or more devices (not shown) can be configured and/or viewed;
- one or more application modules 230 for execution by the system 200 for controlling devices, and for reviewing data captured by devices (e.g., device status and settings, captured data, or other information regarding the system 200 and/or other client/electronic devices);
- one or more controller modules 240, which provides functionalities for processing data from the one or more IMUs 204, including but not limited to:
  - data receiving module 242 for receiving data from the one or more IMUs 204 that is to be processed by the controller module(s) 240;
  - filtering module 244 for removing noise from the raw data received by the data receiving module 242;
  - dynamic calibration module 246 for cross-correlating the data between the one or more IMUs 204 (e.g., different gyroscopes and accelerometers of the one or more IMUs 204) to calibrate filtered data for the one or more IMUs 204;
  - motion decomposition module 248 that determines positional and rotational state based on the decomposed output for each of the one or more IMUs;
  - motion synthesis module 250 for synthesizing motion based on the output of the dynamic calibration module 246 and the motion decomposition module 248;
  - drift correction module 252 for correcting drift in the sensor output (e.g., using an Adaptive Continuous Fuzzy Rule (without modus ponens) Bayesian Filter with Trapazoidal Motion Parameters (ACFBT) for the predetermined shape based on the output from the motion synthesis module 250;
  - edge condition handling module 254 that handles complex movements based on the output (e.g., using Artificial Intelligence/Neural Networks/Deep Learning) of the drift correction module 252;
  - receiving absolute position module 256 that receives a first object initial absolute position;
  - calculate absolute position module 258 that calculates, a first object current absolute position using an output of the IMU and the first object initial absolute position;
  - receive referential data module 260 that, in conjunction with communication interface 214, receives, the wireless transceiver referential data from the second object, the referential data may include an second object current absolute position calculated using a second plurality of IMUs associated with the second object;
  - calculate relative position module 262 that calculates a relative position of the first object relative to the second object using the first object current absolute position and the second object current absolute position, wherein the relative position may include at least one of: (i) a distance between the first object and the second object and (ii) an orientation of the first object relative to the second object; and
  - proof of location module 280 configured to broadcast/transmit and receive device location information and trust factor information via the communication interface(s) 214, compare device location information, determine consensus location information, and adjust trust factor information as described below with reference to FIGS. 7-13.

In some implementations, the raw data received by the data receiving module 242 from the IMUs include acceleration information from accelerometers, angular velocities from gyroscopes, degrees of rotation of magnetic field from magnetometers, atmospheric pressure from Altimeters, and differential Pressure Sensors. The raw data is received from each of the IMUs sequentially, according to some implementations. In some implementations, the IMU data is received in parallel.

In some implementations, the filtering module 244 filters the raw data to remove noise from the raw data signals received by the data receiving module 242. The filtering module 244 uses standard signal processing techniques (e.g., low-pass filtering, clipping, etc.) to filter the raw data thereby minimizing noise in sensor data, according to some implementations. The filtering module 244 also computes moving averages and moving variances using historical data from the sensors, according to some implementations.

In some implementations, the dynamic calibration module 246 uses an Artificial Intelligence (AI) framework (e.g., a neural network framework) to calibrate data from the one or more IMUs 204. For example, one or more "neurons" (typically 3 per sensor) are configured in a neural network configuration to calibrate the filtered data for the one or more IMUs 204. To understand how dynamic calibration works, consider first a static configuration for an object. Let us assume further that the shape of the object (sometimes herein called a predetermined shape) is a cuboid for the sake of explanation. A cuboid-shaped object could be placed on a planar surface six different ways (i.e., on six different faces of the cuboid). So there are six orientations to calibrate on. In this static configuration, the system 200 collects a large number of samples (e.g., approximately 1,000 or more samples) for each of the six orientations. This sampled data is collected and stored in memory 220. Later, when raw data is received, the stored sampled data is used as a baseline to correct any offset error in the raw data during sedentary states (i.e., when the object is not moving). In some implementations that use a neural network, the weights of the network are constantly tuned or adjusted based on the received raw data from the IMUs after offsetting the stored sampled data, according to some implementations. A neural network-based solution provides better estimates than a least squares regression analysis or statistical measures. As an example of how the neural network weights are adjusted dynamically, consider when the object is stationary but the neural network output indicates that the object is moving. The weights are readjusted, through back propagation, such that the output will indicate that the object is stationary. Thus the weights settle during times when the object is stationary. In some implementations, the learning rate of the neural network is maximized during sedentary states (sometimes herein called stationary states), and minimized when the object is in motion. Pattern recognition is used to detect whether the object is moving or is stationary so that the learning rate can be adjusted, according to some implementations. The different stationary and mobile states are used to adjust the weights affecting the accelerometer. In some implementations, known reference to the magnetic north is used to constantly adjust the weights that correspond to the magnetometers. In some implementations, the magnetometer data is also used to correct or settle the weights for the accelerometers when the object is moving because the reference point for the magnetic north and gravity vector are always known. Gyroscope data is more reliable than data from accelerometers because it only requires a single level integration. So the gyroscope data is also used to correct accelerometer weights, according to some implementations. It is noted, in some implementations, that the dynamic calibration module 246 is optional, and a pass-through channel passes the output of the filtering module 244 to the motion synthesis module 250 without dynamic calibration.

In some implementations, the motion decomposition module 248 uses pattern recognition techniques to eliminate anomalies due to cross-interaction or interference between the sub-sensors, in each IMU. Experimental data is collected for controlled translational and rotational movements of an object. For example, the behavior of the gyroscope is tracked under constant velocity and the pattern is stored in memory. When the gyroscopic data follows the known pattern, the fact that the object is under constant velocity is deduced based on this pattern. Similarly, accelerometer data (e.g., constant gravity vector) can be used to identify patterns to correct errors in gyroscopic data and/or magnetometer data, and magnetometer data can be used to identify patterns to correct errors in accelerometer data and/or gyroscope data, according to some implementations. For example, in some implementations, the motion decomposition module 248 distinguishes between constant velocity state and stationary state of the object. For example, while the object is in a constant velocity state, such as when the object is moving at a constant velocity, the gyroscope registers noise (due to vibrations) which is captured as a signature (or a pattern) and stored in memory. The noise may cause the gyroscope to register that the object is moving at varying velocities rather than a constant velocity. On the other hand, while the object is in a constant velocity state, the accelerometer does not show change in output under constant velocity. Some implementations detect the differences in the behavior (e.g., noise level) of the gyroscope, and/or the absence of change in output of the accelerometer to deduce that the pattern corresponds to an object in a constant velocity state. In such instances, because the object is in a constant velocity state, the motion decomposition module 248 uses a previously calculated velocity for current position measurements as discussed herein.

In some implementations, the motion decomposition module 248 removes anomalies by observing changes in patterns detected from sensor data, such as when the object stops moving or rotating abruptly, as another effect to correct for anomalies. In some implementations, the motion decomposition module 248 analyzes several distinct stored patterns for correcting anomalies in each of the sensors. In some implementations, the motion decomposition module 248 categorizes the type of translational and/or rotational movements of each IMU of the tracked object and outputs the pattern or the category for the motion synthesis module 250. For example, the motion decomposition module 248 deduces that each IMU is in one of many states, including simple linear motion, simple linear motion with rotation, non-linear motion with simple rotation. In some implementations, output from the motion decomposition module 248 additionally controls the learning rate in the dynamic calibration module 246.

In some implementations, the motion synthesis module 250 uses the state information (e.g., constant velocity, constant acceleration, changing acceleration, in combination with rotation) from the motion decomposition module 248 to select one or more algorithms. The motion synthesis module 250 subsequently applies the one or more algorithms on the data output from dynamic calibration module 246 to synthesize the motion of the object (sometimes herein referred to as the computation of overall rectified data for the one or more IMUs). For example, if the state information from the motion decomposition module 326 indicates that the object is rotating, the motion synthesis module 250 uses an equation to compute the axis of rotation based on the difference in angular momentum of the IMUs (as indicated by the output of the dynamic calibration module) and the known shape outlined by the predetermined position of the different IMUs. To elaborate on this example, suppose the object is mounted with IMUs in a planar configuration, such as in FIG. 1B, with four sensors, each sensor in a corner. Suppose further that the planar configuration positioned vertically in a diamond shape, with the longitudinal axis passing through the top IMU and the bottom IMU. Now, if the planar (diamond-shaped) object is rotated about the longitudinal axis, the side IMUs on either side of the longitudinal axis will share the same angular momentums but will have different angular momentums as compared to the top IMU and the bottom IMU, and the top IMU will have an angular velocity greater than the bottom IMU that is closer to the axis of rotation. The motion synthesis module 250 computes or synthesizes the rotational axis data from the differences in the angular momentums and the known distances between the sensors, based on the shape formed by the IMUs.

In some implementations, the drift correction module 252 uses shape correction which, in some implementations, to remove drift by re-conforming sensor positions and orientation to the known (sometimes herein called predetermined) shape. In some implementations, the drift correction module 252 computes the skewness in the data by the motion sensors based on the variation in the norms, distances and angles between the sensors. If the variation in the norms exceeds a threshold, the drift correction module 252 generates a correction matrix (sometimes called a drift matrix) to eliminate drift in successive sensor readings. A shape correcting module (not shown) corrects the data output from the dynamic calibration module (sometimes herein called the clean or filtered data) using the correction matrix, by subtracting the predicted drift from the clean data, in a continuous or iterative fashion, according to some implementations. For example, after every reading of sensor data, previously generated and stored data from the drift correction module 252 is used to correct the clean data output from the noise-filtered, and dynamic calibration module, according to some implementations.

In some implementations, the edge condition handling module 254 handles complex movements (e.g., while spinning along two axes, and moving across on a straight line, say the object also lifts up) and/or transitional movements (e.g., spinning to laterally moving along a straight line) to reduce drift based on the output of the drift correction module 252. In some implementations, the edge condition handling module 254 uses AI to apply probability weightings to compensate for the edge conditions. In some implementations, the edge condition handling module 254 blends a current object common data point (e.g., output by the drift correction module 252) and the previous object common data point (e.g., previous output for a prior sensor reading by the drift correction module 252 that is stored in memory) to remove the edge condition.

Even though in some complex scenarios, drift may not be completely corrected, perpetual drift or constant drift can be eliminated with the aforementioned modules. Furthermore, in some implementations, the drift observed by the combination of the modules described herein is in the order of centimeters or even millimeters, whereas alternate external reference based drift elimination (e.g., using a GPS) could sometimes result in a drift in the order of meters.

In some implementations, the one or more controller module(s) 240 includes device-related information. In some implementations, the device related information includes device identifier, and/or device characteristics. In some implementations, the device identifier may identify the device to other objects in the network. In some implementations, the device characteristics include information related to whether the device corresponds to an object that is operated manually or autonomously. In some implementations, the device characteristics include information related to whether the device corresponds to a static object, such as a building or an appliance, or a dynamic object, such as an automobile. In some implementations, the device characteristics include information related to device operational state, such as whether a device is on or off.

In some implementations, the one or more controller module(s) 240 includes location-related information (e.g., absolute positions) for other objects. Some implementations include specific features (or characteristics or operational states) and/or encoding of such features, of the system. In some implementations, the operational state of an object may change based on certain criteria detected in the network. For example if the device is embedded in a lamp post that has a light bulb that switches on/off, this characteristic is stored in the modules 240. In some implementations, this information relates to objects (e.g., lights) inside buildings, so the location of such objects inside the building are also stored. Similarly, if the device is in a mobile object (e.g., a car), the object's characteristics are also stored in the modules 240. For example, such information may include information on whether the object, such as a car, can switch on/off turn signals, etc. In some implementations, the characteristics described above are communicated to and/or received from other objects using the receive referential data module 260 that, in conjunction with communication interface 214, sends and/or receives, the wireless transceiver referential data from other objects. In some implementations, the modules 240 store information related to other objects up to a maximum or predetermined number of objects, and/or calculates information related to those objects that do not have relevant information stored, based on the stored information.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise rearranged in various implementations. In some implementations, memory 220, optionally, stores a subset of the modules and data structures identified above. Furthermore, memory 220, optionally, stores additional modules and data structures not described above. In some implementations, one or more processing modules and associated data stored in the memory 220 are stored in and executed on a second processing device other than the system with drift-free motion sensors 200 that is configured to receive and process signals produced by the IMUs 204. For example, the second processing device might be a computer system, smart home device or gaming console that executes applications (e.g., computer games) at least some of whose operations are responsive to motion signals provided by the IMUs.

Figure 3:
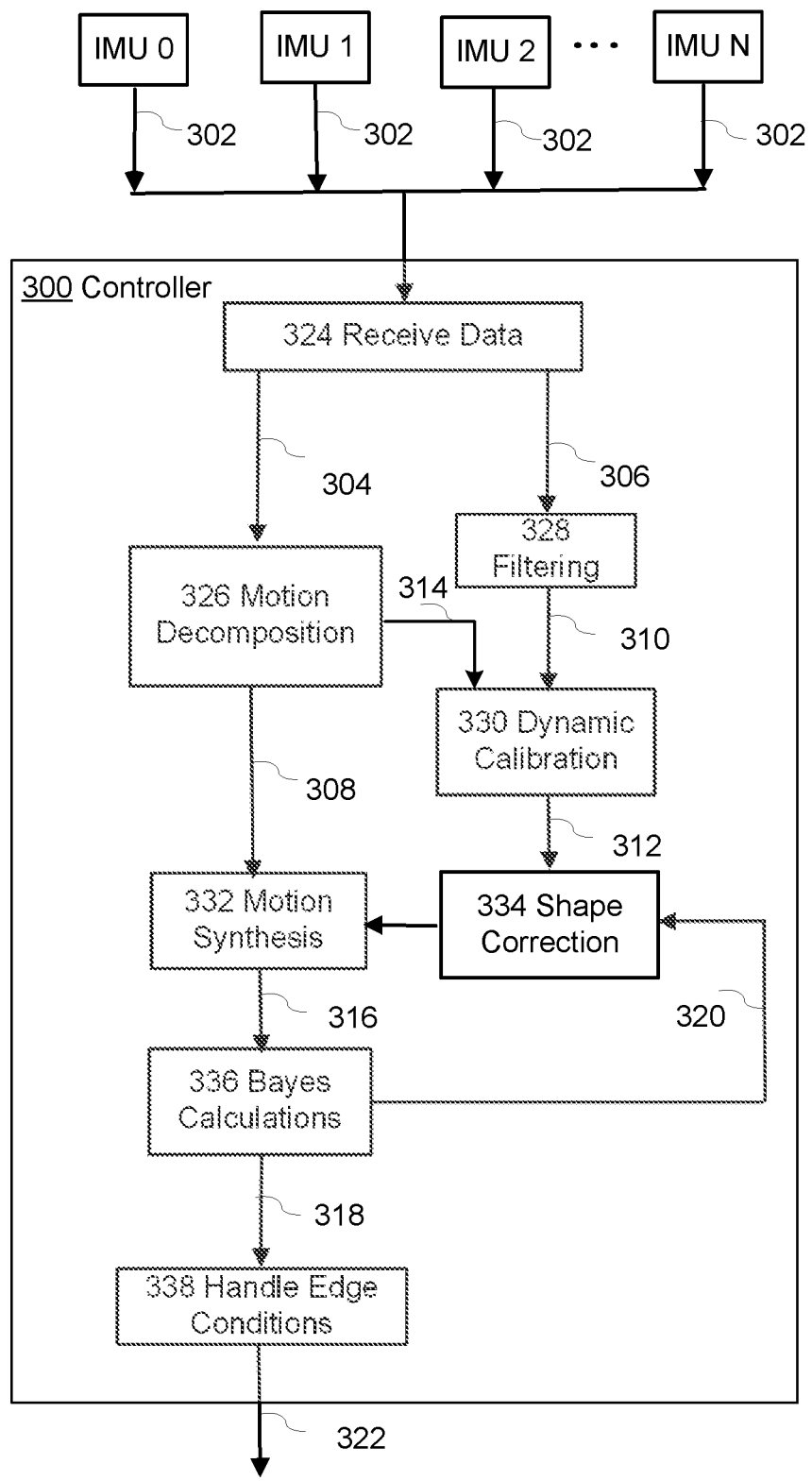
FIG. 3 is a flow diagram illustrating the flow of sensor data through a representative system with drift correction, according to some implementations.

FIG. 3 is a flow diagram illustrating the flow of sensor data through a representative system with drift-free sensor (s), according to some implementations. Raw data from the one or more IMUs 302 (e.g., IMU 0, IMU 1, IMU 2, . . . , IMU N) is received (324) by the controller 300 (e.g., controller module 240). As previously mentioned, in some implementations, the controller receives the data from the one or more IMUs in parallel (as shown in FIG. 3). The received data is output as raw data (304) to the motion decomposition module 326, according to some implementations. In some implementations, the raw data is also input as data 306 to a filtering module 328 which filters the raw data to produce filtered data 310 which is in turn input to a dynamic calibration module 330. In some implementations, the motion decomposition module 326 also controls (314) the learning rate of the dynamic calibration module 330. In some implementations, the motion decomposition module 326 and/or the dynamic calibration module 330 are optional modules. In such cases, the filtered data 310 is input (not shown) to the motion synthesis module. The motion synthesis module 332, in these cases, does not know the pattern or category of motion but iteratively applies one or more algorithms or equations to synthesize motion. In some implementations, steps of the motion decomposition module 326 and the dynamic calibration module 330 execute asynchronously and/or in parallel. The Bayes calculation step 336 uses the output 316 of the motion synthesis module to generate drift correction matrices 320 (as described previously with reference to FIG. 2) which is consumed by a shape correction module 334 to correct input in the next iteration (i.e., when and after such data becomes available) of motion synthesis. Although not shown in FIG. 3, in some implementations, during a first set of one or more iterations, the shape correction data is not available, and the dynamic calibration output 312 is input to the motion synthesis module 332. In some implementations, the output of the Bayes calculation step 336 (318) is input to an edge conditions module 338 to handle edge conditions (described above in reference to FIG. 2) for complex movements and dynamic learning. The output 322 indicates drift-free real motion output of the controller, according to some implementations.

In some implementations, filtering module 328 includes similar functionality to filtering module 244 in FIG. 2; the motion decomposition module 326 includes similar functionality to the motion decomposition module 248 in FIG. 2; dynamic calibration module 330 includes similar functionality to dynamic calibration module 246 in FIG. 2; shape correction module 334 includes similar functionality to shape correction module described above in the description for FIG. 2; the motion synthesis module 332 includes similar functionality to the motion synthesis module 250 in FIG. 2; Bayes calculations module 336 includes similar functionality to drift correction module 252 in FIG. 2; and the edge conditions module 338 includes similar functionality to the edge condition handling module 254 in FIG. 2.

FIGS. 4A-4D illustrate a flowchart representation of a method 400 of tracking position and orientation of an object using a tracking device, according to some implementations. In some implementations, the tracking device includes (402) one or more sides that define a predetermined shape, and a plurality of inertial measurement units (IMU) mounted to the one or more sides of the predetermined shape. Further, each IMU includes a first sub-sensor and a second sub-sensor, and each IMU is positioned at a predetermined distance and orientation relative to a center of mass of the tracking system, according to some implementations. FIGS. 1A-1F described above illustrate various configurations of sensors mounted on 3D objects, according to some implementations. In some implementations, the first sub-sensor and the second sub-sensor of the tracking device (e.g., IMUs 204 of FIG. 2) are (404) each one of: accelerometer, magnetometer, gyroscope, altimeter, and pressure sensor and the first sub-sensor is a different sensor type than the second sub-sensor. In some implementations, the predetermined shape of the tracking device is (406) one of: a plane, a tetrahedron, and a cube. In some implementations, the tracking device also includes a controller communicatively coupled to the plurality of IMUs. An example system 200 with IMUs 204 was described above in reference to FIG. 2, according to some implementations.

In some implementations, each IMU of the tracking device detects (408) movement of the object and generates inertial output data representing location and/or orientation of the object. For example, IMUs 204 in FIG. 2 or the sensors in FIGS. 1A-1F use a combination of accelerometers, magnetometers, gyroscopes, altimeters, and/or pressure sensors to detect movement of the object and generate data that represents location and/or orientation of the object.

In some implementations, the tracking object, at the controller (410), receives (412) first sub-sensor inertial output data and second sub-sensor inertial output data from each of the plurality of IMUs. For example, the data receiving module 242 of the system 200 receives the output from the one or more IMUs 204 via the one or more communication buses 216. In some implementations, the controller receives (414) the first sub-sensor inertial output data and the second sub-sensor inertial output data from each of the plurality of IMUs periodically at less than approximately 1 ms for continuous high sampling rate.

In some implementations, the controller uses a filtering module (e.g., module 244) to filter (416) the first sub-sensor inertial output data and second sub-sensor inertial output data to minimize signal noise.

Figure 4A:
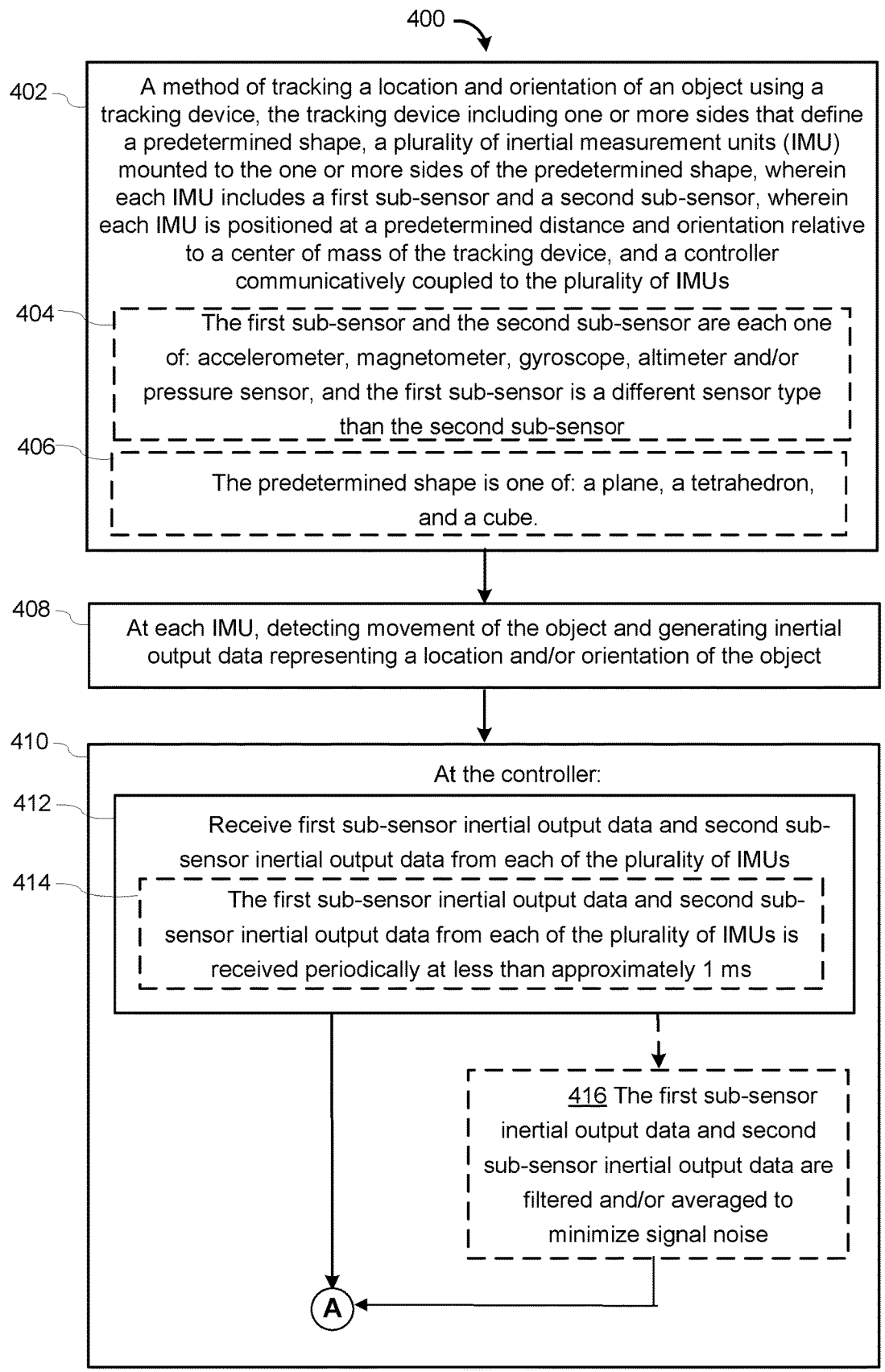
FIGS. 4A-4D illustrate a flowchart representation of a method of tracking position and orientation of an object using a tracking device, according to some implementations.
Figure 4B:
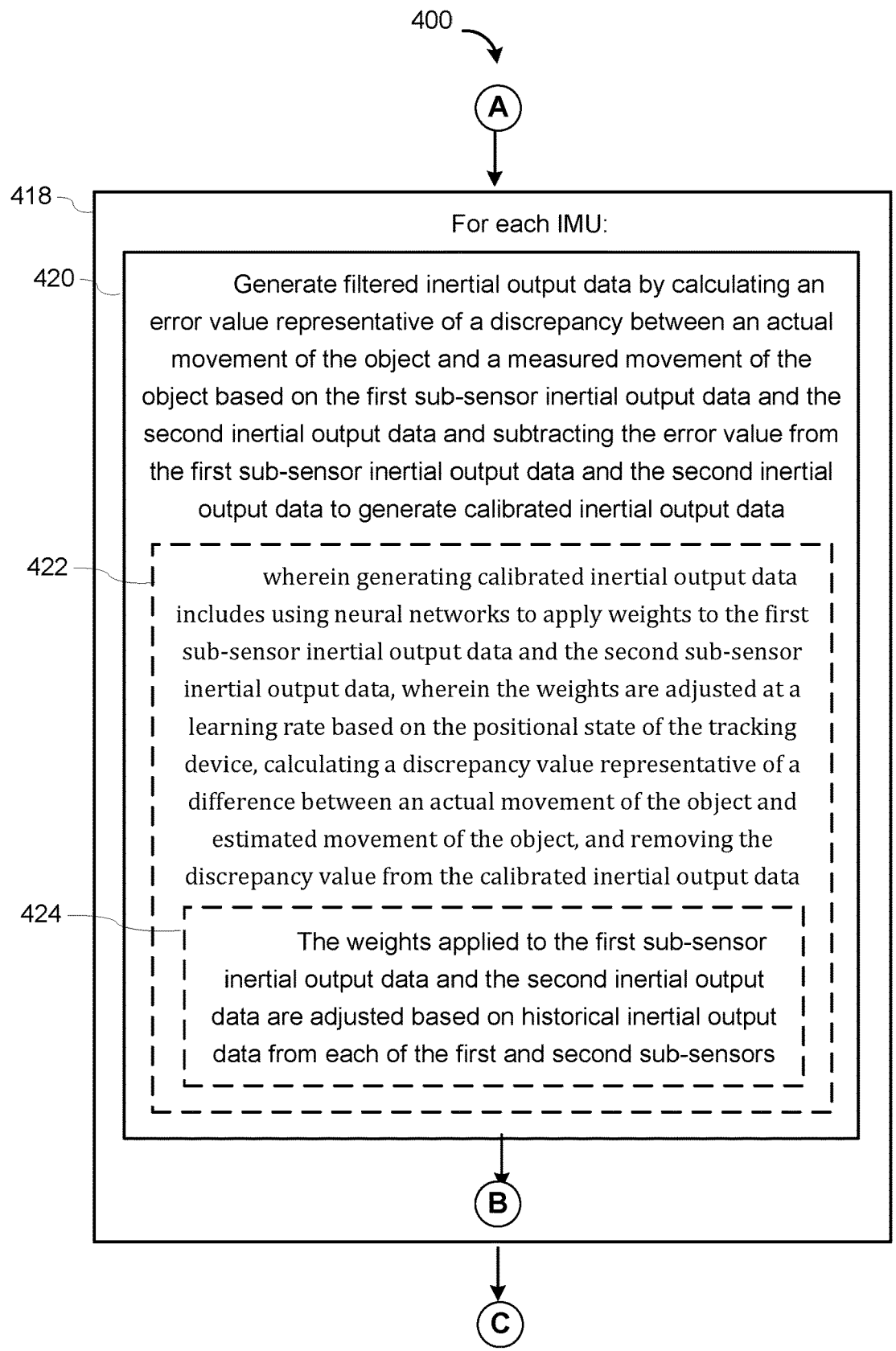

Referring now to FIG. 4B, the controller performs a sequence of steps 418 for each IMU, according to some implementations. In some implementations, the controller generates (420) calibrated inertial output data based on the first sub-sensor inertial output data and the second sub-sensor inertial output data. For example, the controller uses the dynamic calibration module 246 to generate calibrated inertial output data. In some implementations, the controller calculates the error value using (422) neural network weights to evaluate the first sub-sensor inertial output data and the second sub-sensor inertial output data, wherein the weights are adjusted at a learning rate based on the positional state (e.g., stationary position state) of the tracking device, calculating a discrepancy value representative of a difference between an actual movement of the object and estimated movement of the object, and removing the discrepancy value from the calibrated inertial output data, (e.g., using the output of a motion decomposition module, such as module 248). In some implementations, the controller applies (424) neural network weights to the first sub-sensor inertial output data and the second inertial output data based on historical (e.g., prior or previous) inertial output data from each of the first and second sub-sensors. Although not shown, the controller stores and/or accumulates inertial output data received from the IMUs over time that is later retrieved as historical data.

Figure 4C:
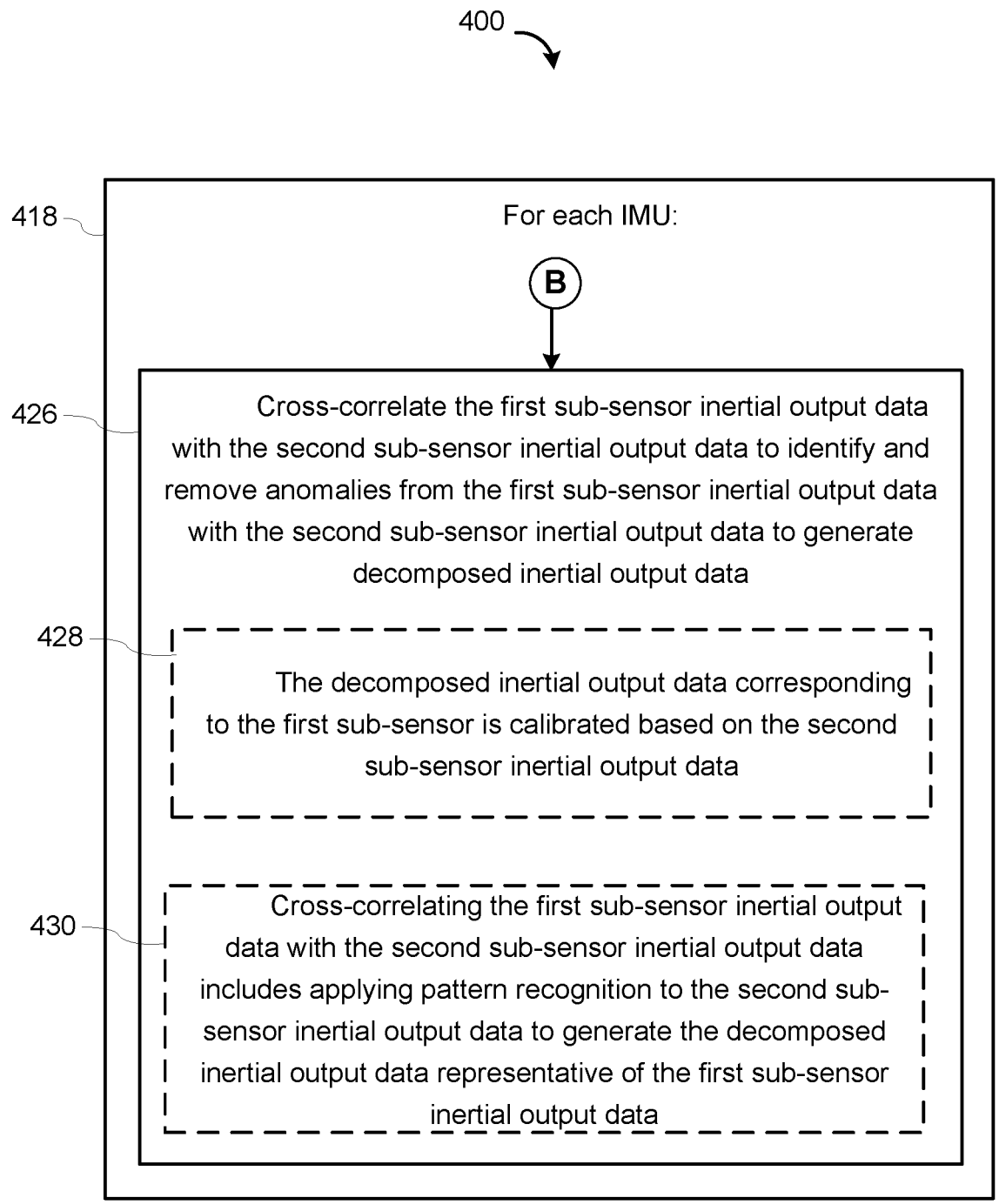

Referring next to FIG. 4C, the controller uses the dynamic calibration module (e.g., module 246) to cross-correlate (426) the first sub-sensor inertial output data with the second sub-sensor inertial output data to identify and remove anomalies from the first sub-sensor inertial output data with the second sub-sensor inertial output data to generate decomposed inertial output data for each IMU, according to some implementations. In some implementations, the controller calibrates (428) the decomposed inertial output data corresponding to the first sub-sensor based on the second sub-sensor inertial output data. In some implementations, the controller cross-correlates the first sub-sensor inertial output data with the second sub-sensor inertial output data by applying (430) pattern recognition (e.g., by using a motion decomposition module, such as module 248) to the second sub-sensor inertial output data to generate the decomposed inertial output data representative of the first sub-sensor inertial output data.

Figure 4D:
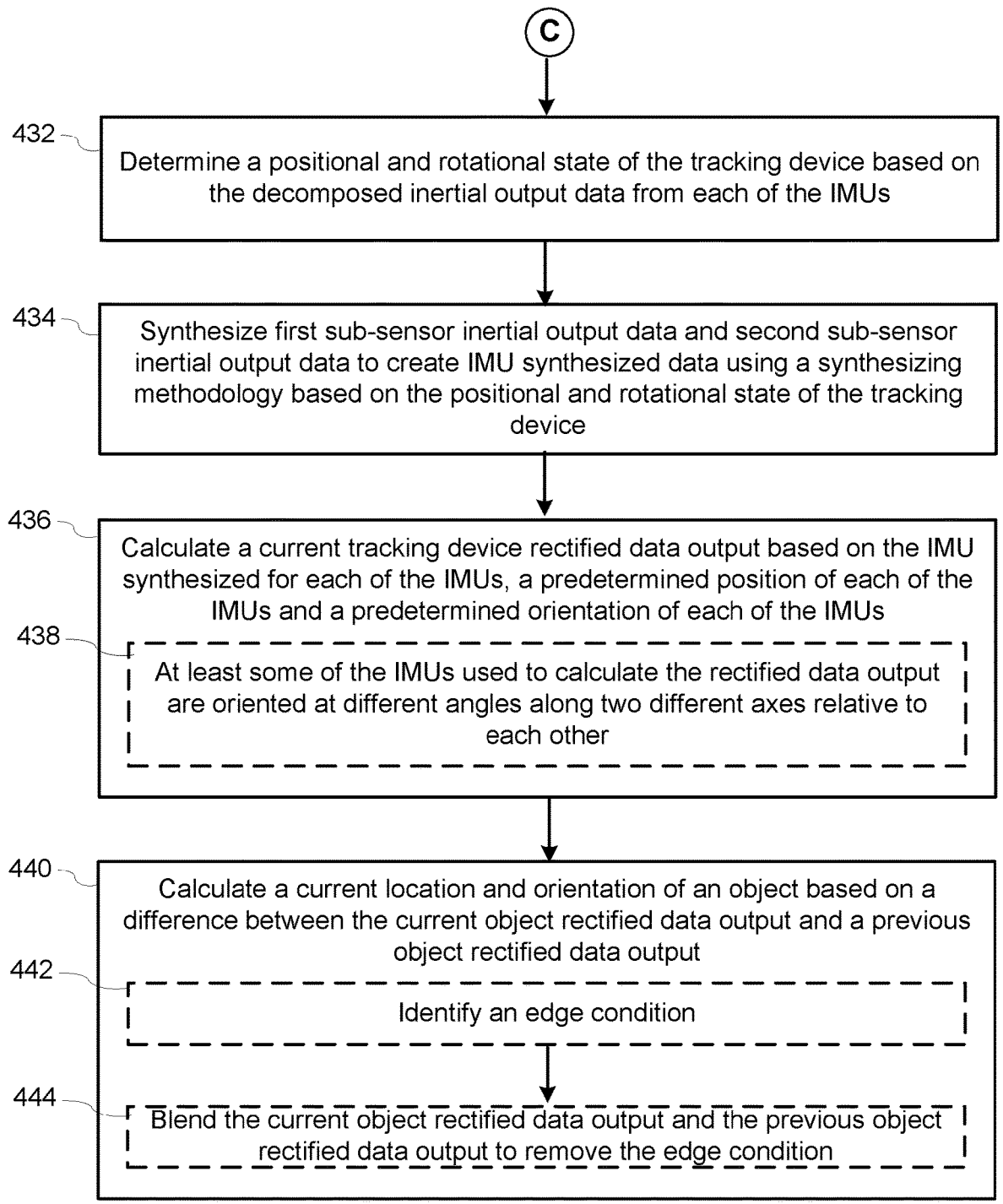

Next, referring to FIG. 4D, the controller determines (432), using a motion decomposition module (e.g., module 248 described above), a positional and rotational state of the tracking device based on the decomposed inertial output data from each of the IMUs, according to some implementations.

Subsequently, the controller synthesizes (434), using a motion synthesis module (e.g., module 250 described above), first sub-sensor inertial output data and second sub-sensor inertial output data to create IMU synthesized data using a synthesizing methodology based on the positional and rotational state of the tracking device, according to some implementations.

In some implementations, the controller calculates (436), using a ACFBT calculation module (not shown), a current tracking device rectified data output based on the data synthesized for each of the IMUs, a predetermined position of each of the IMUs and a predetermined orientation of each of the IMUs to confirm to a predetermined shape. In some implementations (438) of the controller, at least some of the IMUs used to calculate the common data point are oriented at different angles along two different axes relative to each other.

The controller subsequently calculates (440), using a current position and orientation determination module (e.g., module 252 in FIG. 2, or steps 336 and 334 in FIG. 3), a current position and orientation of an object based on a difference between the current object rectified data output and a previous object rectified data output, according to some implementations. In some implementations, the controller identifies (442) an edge condition (e.g., complex movements described above) and blends (444), using an edge condition handling module (e.g., module 254 described above), the current object rectified data output and the previous object rectified data output to remove the edge condition.

It should be understood that the particular order in which the operations in FIGS. 4A-4D have been described is merely an example and is not intended to indicate that the described order is the only order in which the operations could be performed. One of ordinary skill in the art would recognize various ways to reorder the operations described herein.

Referring next to FIGS. 5A-5D, there is shown diagrams illustrating an exemplary implementation of calculating the position of an object, relative to another object using the drift free motion sensor system 200-*i* described herein. In this exemplary implementation, each of the cars 502 in FIGS. 5A-5D are the "objects". As shown in FIG. 5 and described in more detail below, the drift free motion sensor system 200-*i* IMU may be connected to different objects (also referred to herein as nodes) in a "smart city" configuration and may each track distances and/or direction of motion of its own moving object as well as other moving objects or nodes in an interconnected mesh network with precision, accuracy, and redundancy so that different objects can maneuver throughout an environment with other objects without colliding. In some implementations, an object may be a vehicle, a cell-phone, a mobile device, a building, a stationary light-pole, among other things. While the drift free motion sensor system 200-*i* may operate without calibration from other external objects, by adding more objects in a mesh-network configuration, more redundancy and fail-safe options may be created. For example, if some nodes in the mesh network fail to communicate position data, the remaining nodes in the mesh network may take over and compensate for the failed nodes.

In other implementations, the objects may correspond to other devices including, but not limited to, mobile computing devices, projectiles, helmet mounted displays, gaming consoles, or other devices included in Exhibit A.

Turning now to FIGS. 5A-5D, first car 502-1, second car 502-2 and third car 502-3 may each be traversing along a roadway. Each of the cars 502 may have a drift free motion sensor system 200-*i* to track the position of itself and other cars as the cars continue traversing along the roadway. By utilizing position data of each of the cars, a particular car may either alert a driver or alter a driving path of the particular car in response to a determination that the cars may collide at some point along the roadway. The drift free motion sensor system 200-*i* may each include a respective controller 300, a wireless transceiver 214, and one or more IMUs 302. The controller 300, in conjunction with the IMUs 302 may be configured to provide drift free orientation and position data.

Initially, the first car 502-1 may be configured to receive from an external source an initial absolute position (e.g., seed position) to the drift free sensor system 200-1 of the first car 502-1. The initial absolute position may be a coordinate position in e.g., a latitude/longitude format (e.g., XX Latitude and YY Longitude), among others. As used herein, the term absolute position may refer to a position of an object relative a predefined position on the earth. The predefined position on the earth may correspond to a city, province, road, or building.

While the car 502-1 continues traversing along the roadway, the first car 502-1 may then sense, using the IMU of the drift free sensor system 200-1, that the first car 502-1 is in motion at a velocity of 65 km/hr and has moved 10 meters North.

Figure 5A:
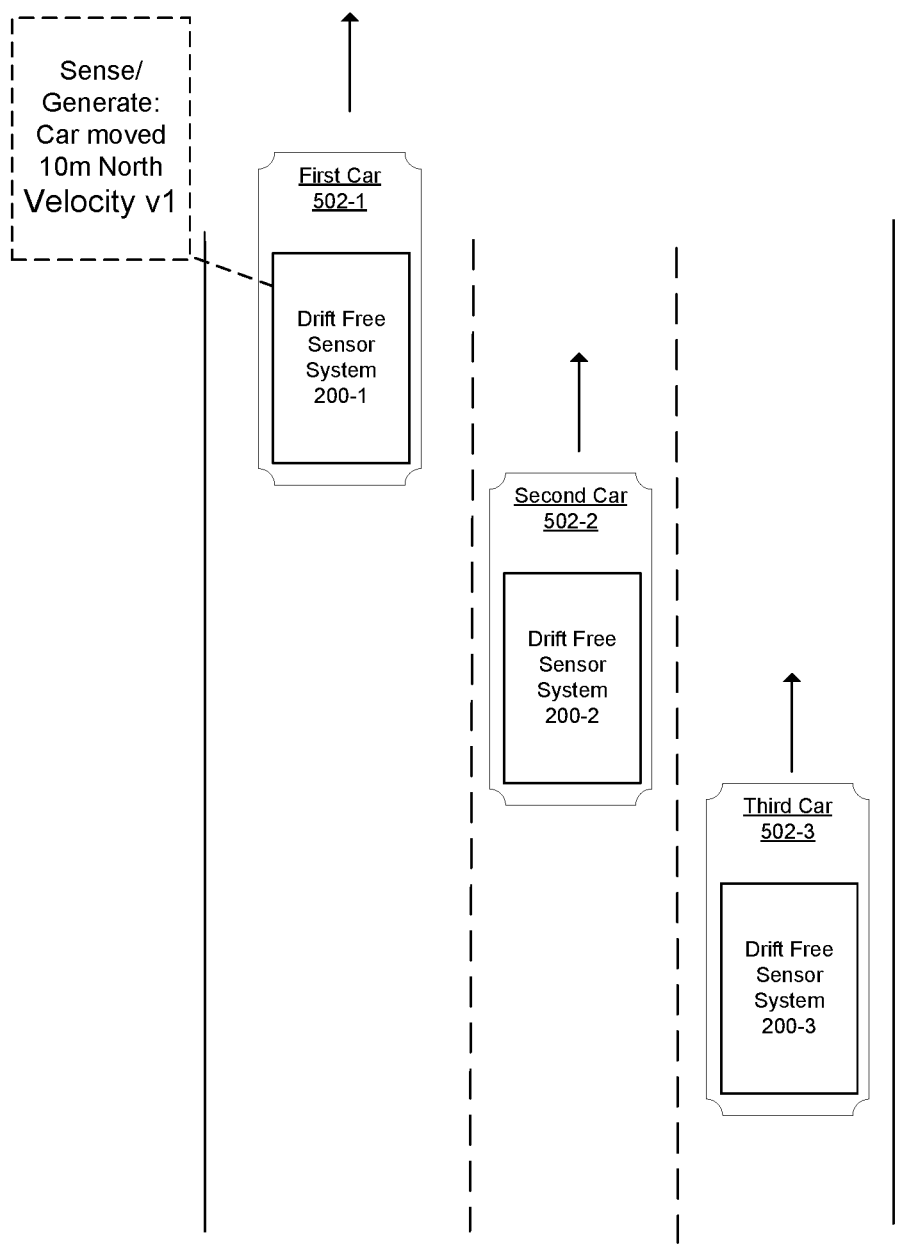
FIG. 5A-5D is a block diagram illustrating the method of calculating the position of an object.
Figure 5B:
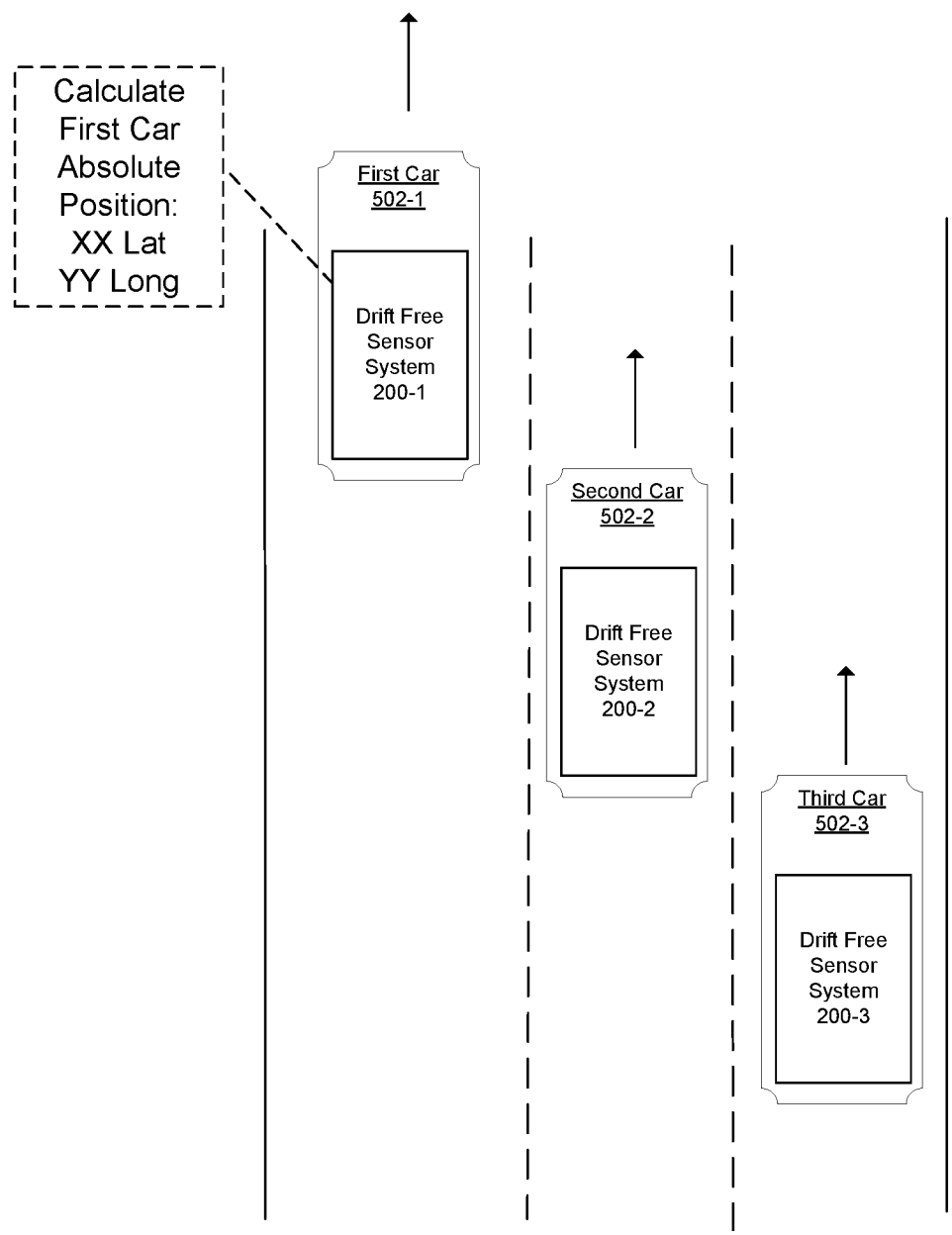

The first car 502-1 may then generate, using the first plurality of IMUs 200-1 and controller 300, a motion signal representative of the motion of the first car 502-1. The motion signal may be calculated using one or more of the modules of controller 300, as shown in FIG. 3 and described herein. In some implementations, the motion signal may be generated by calculating a rectified data output based on sensed motion data from each of the first plurality of IMUs, a predetermined position of each of the first plurality of IMUs and a predetermined orientation of each of the first plurality of IMUs As shown in FIG. 5B, the first car 502-1 may then calculate, using the controller 300, a first car 502-1 current absolute position. For example, the first car 502-1 may calculate the current absolute position of the first car 502-1 to be XX Latitude and YY+10 m Longitude, using an output of the IMU 200-1 and the first car 502-1 initial absolute position by, for example, summing the output of the IMU with the latitude and longitude coordinate data.

Figure 5C:
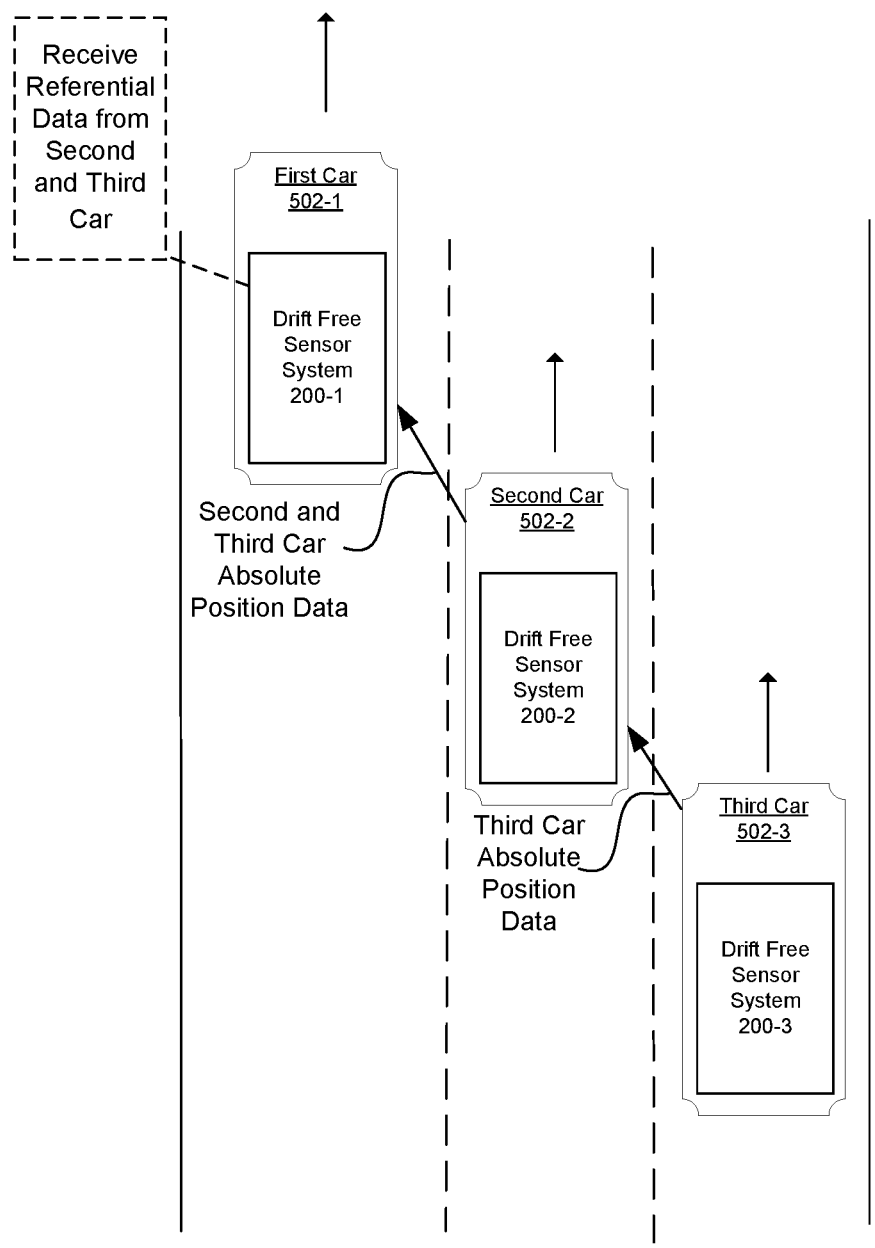

As shown in FIG. 5C, the first car 502-1 may receive referential data from one or more other cars (e.g., car 502-2 and car 502-3). In some embodiments, one or more of the cars (e.g., car 502-3) may include a wireless transmitter that lacks the capability to transmit referential data to the first car. In these implementations, a mesh network may be created whereby the second car 502-2 may relay the referential data from the third car 502-3 to the first car 502-1. For ease of understanding, only three cars are shown, however, in some implementations, the mesh network may include N cars (or objects generally), with each car relays referential/positional data from one car to another car. Third car 502-3 may send referential data of the third car 502-3 to the second car 502-2 and the second car 502-2 may send the referential data of the second car 502-2 and third car 502-3 to the first car 502-1. The referential data of the second car 502-2 may include the current absolute position of the second car 502-2 calculated using a second plurality of IMUs 200-2 associated with the second car 500-2. The referential data of the third car 502-3 may include the current absolute position of the third car 502-3 calculated using a third plurality of IMUs 200-3 associated with the third car 502-3. The first car 502-1 may then receive, using the wireless transceiver of the first car 502-1, referential data from the second car 502-2 and third car 502-3.

Figure 5D:
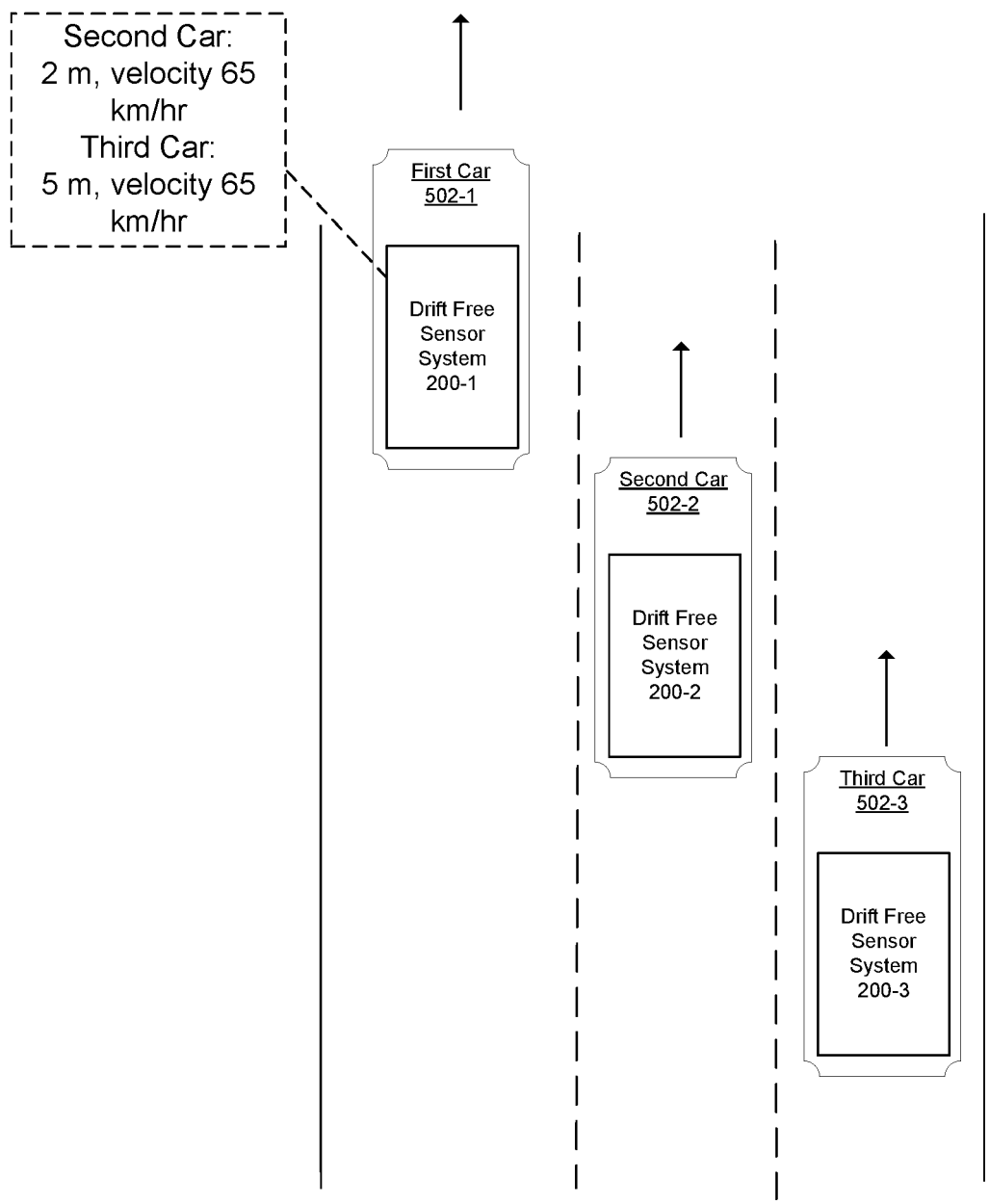

As shown in FIG. 5D, the first car 502-1 may calculate a relative position of the first car 502-1 relative to the second car 502-2 and third car 502-3 using the first car 502-1 current absolute position, the second car 502-2 current absolute position and/or the third car 502-3 current absolute position. The relative position may include at least one of: (i) a distance between the first car 502-1 and the second car 502-2 and a distance between the first car 502-1 and the third car 502-3 and (ii) an orientation of the first car 502-1 relative to the second car 502-2 and an orientation of the first car 502-1 relative to the third car 502-3. For example, the first car 502-1 may determine, based on the referential data received from the second car 502-2 and third 502-3 shown in FIG. 5C, the distance between the first car 502-1 and the second car 502-2 to be 2 meters and the distance between the first car 502-1 and the third car 502-3 to be 5 meters. In some implementations, the relative positions of the first car 502-1 relative to the second car 502-2 and third car 502-3 may be calculated without using an external reference signal.

As shown in FIG. 5D, the first car 502-1 may calculate a velocity of the second car 502-2 and third car 502-3 using current absolute position of the first car 502-1, current absolute position of the second car 502-2, and/or current absolute position of the third car 502-3. In the example shown in FIG. 5D, the velocity of the second car 502-2 and third car 502-3 is 65 km/hr.

In some implementations, each object may share an observation of a first external object with a second external object. For example, the first car 502-1 may calculate a position of the second car 502-2, and communicate the observation of the position of the second car 502-2 to the third car 502-3. The third car 502-3 may use the observation of the position of the second car 502-2 received from the first car 502-1 rather than, or in addition to, calculating the position of the second car 502-2 independently. Similarly, the third car 502-3 can calculate a position for the second car 502-2 and communicate the same to the first car 502-1.

In some implementations, the objects are connected as nodes in a mesh network allowing the objects to reinforce calculations with observations from the other objects. With the exchange of information, entropy (loss of information) is decreased over time. In this way, in some implementations, each node (or the car in this example) characterizes positions (either absolute or relative positions) by reconciling its calculated positions with that of the information received from other nodes. In some implementations, the objects behave like an elastic system, reinforcing accurate estimates, and revert to a point of rigidity that reinforce correctness, and in some sense, perpetually and/or continuously self-correcting.

In some implementations, the drift free sensor system 200-1 stores historical data (e.g., previous 15 states) and applies the historical data for correction. Some implementations store timestamps for the entries, and/or weigh more recent entries for improving accuracy. Some implementations repeat the process of calculating, exchanging, and reconciling information, over several cycles. In some implementations, the drift-free sensor system 200-1 stores data from other objects in the order it is received, and/or with timestamps. Suppose recent data does not correlate with historical data, some implementations use a Hidden Markov Model (HMM) and use Bayesian probabilities to calculate an accurate estimate of absolute positions of other objects. Some implementations store all observations as time-ordered entries and combine or fuse time entries, depending on storage constraints.

Some implementations recognize new nodes (cars, in our example) and adjust calculation of relative positions accordingly. For example, suppose a node just started or joins the mesh network. The node does not have prior prediction, and initially incurs more errors in its calculation that stabilizes (or collapses errors) over time (e.g., after 2-3 iterations). Other nodes in the network also recognize the new node, and weigh the information from the node accordingly. In some implementations one or more nodes do not have own sensors but are merely calculating and/or relaying information based on information received from other objects or nodes. In some implementations, other nodes in the network recognize the nodes without own sensors, and weigh information obtained from such nodes accordingly (e.g., provide lower weight to such observations).

In some implementations, the drift free sensor system 200-1 may determine that the relative position of the first car 502-1 to the second car 502-2 meets emergency criteria. For example, the second car 502-2 may be swerving towards the first car 502-1, such that the first car 502-1 and second car 502-2 may collide at some point in the future. In response, the drift free sensor system 200-1 may either alert the driver and/or cause the first car 502-1 to perform an evasive maneuver, wherein the evasive maneuver includes braking the first car and/or turning the first car 502-1 to avoid the second car 502-2.

In some implementations, the drift sensor system 200-1 may control one or more objects based on the prediction of direction, position, orientation, and/or acceleration of moving objects. For example, the drift sensor system 200-1 may switch on/off a home's electrical systems (e.g., cooling systems) or an oven inside a home, in response to an object (e.g., the first car 502-1) moving towards the home or an object inside the home (e.g., a toaster oven) or in response to the drift sensor system 200-1 calculating a relative position of the external object and detecting that a distance between the external object and the home (or object inside the home) is within a predetermined threshold. To further illustrate, in another context, a lamp post, on a city street, or a driveway of a home, may switch on (switch off) automatically in response to detecting that a car is approaching (leaving) the lamp post. Similarly, such systems can be used for traffic flow analysis, to predict number of moving objects (e.g., cars, humans with wearable devices, mobile phones) in an area. In the context of Internet of Things (IoT) environment, IoT devices may be controlled via the drift sensor system 200-1, a controller on a motherboard coupled to the system 200-1, or a communication controller that is communicatively coupled (e.g., using a wireless service) to the IoT device.

In some implementations, the car 502-1 may include a user interface that displays a graphical representation of a map. The drift free sensor system 200-1 may display a position of the car 502-1 on the graphical representation of the map using the relative position of the first object relative to the second object.

In some implementations, the drift free sensor system 200-1 may utilize map data to calibrate position data.

In some implementations, the drift free sensor system 200-1 may calculate a velocity of the first car 502-1 using the referential data from the second car 502-2. In some implementations, the drift free sensor system 200-1 may be connected to the on-board diagnostic (OBD) system of the first car 502-1 to receive velocity data from the OBD system. The velocity data may be used by the motion synthesis module 250 as state information to select one or more motion synthesis algorithms as described herein.

In some implementations, the drift free sensor system 200-1 may utilize the referential data to update (e.g., calibration or redundancy check) the absolution position of the first car 502-1. For example, the drift free sensor system 200-1 may triangulate the absolute position of the first car 502-1 using the referential data.

In some implementations, the drift free sensor system 200-1 may calculate velocities of other cars or objects based on change in relative positions of the objects over time. For example, suppose the second car is at a relative position p1 at time t1, and at a relative position p2 at time t2, the drift free sensor system 200-1 may calculate the relative velocity of the second car by dividing the absolute difference between p1 and p2 by the difference between t1 and t2.

Figure 6:
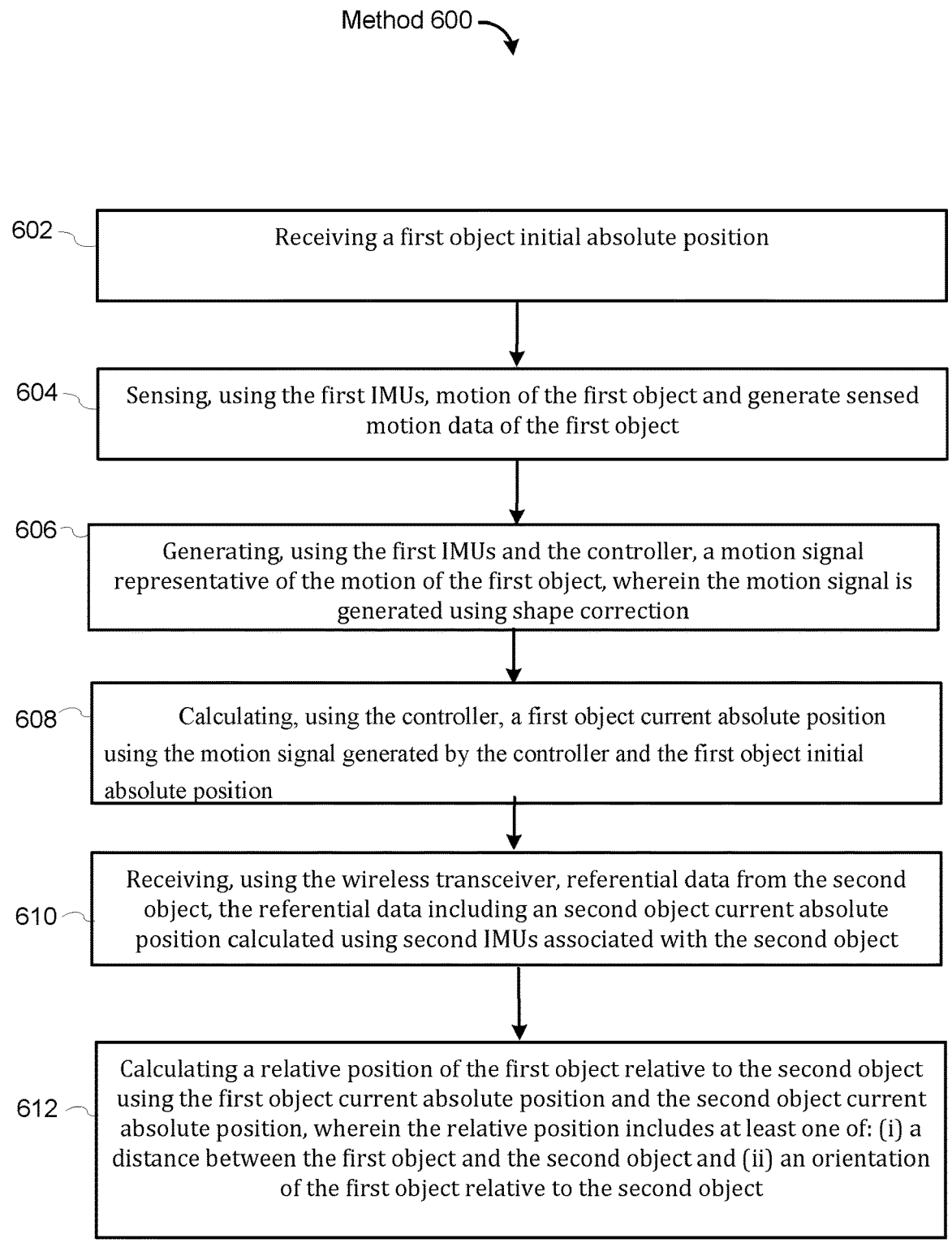
FIG. 6 illustrates a flowchart representation of a method of calculating the position of an object.

FIG. 6 illustrates a flowchart representation of a method 600 of calculating the position of a first object relative to a second object, according to some implementations. For example, and with reference to FIGS. 5A-5D, first car 502-1 calculates the position of first car 502-1 relative to second car 502-2 and third car 502-3.

In some implementations, the method is implemented at a first object. The first object may be a static object, such as a light post, traffic light or a building. The first object may be a moving object, such as a car, mobile device, gaming console or projectile. The first object may be a drift free motion sensor system 200 that includes including a controller (e.g., controller 300), a wireless transceiver (e.g., communication interface 214), and a first plurality of inertial measurement units (IMUs) each mounted in one or more positions and orientations relative to other of the first plurality of IMUs. Example orientations/positions of the IMUs are shown in FIGS. 1A-1F.

In some implementations, the first object is configured to receive (602) a first object initial absolute position. The first object initial absolute position may be an initial seed position to initiate the IMUs of the first object. The initial absolute position may be in a latitude/longitude format (e.g., XX Latitude and YY Longitude), among others.

In some implementations, the first object is configured to sense (604), using the first plurality of IMUs (e.g., IMU 200-1), motion of the first object. For example, as shown in FIG. 5A, the first car 502-1 may sense, using the IMU of the drift free sensor system 200-1, that the first car 502-1 is in motion and has moved 10 meters North.

In some implementations, the first object is configured to generate (606) a motion signal representative of the motion of the first object. The motion signal may be calculated using one or more of the modules of controller 300, as shown in FIG. 3 and described herein. In some implementations, the motion signal may be generated by calculating a rectified data output based on sensed motion data from each of the first plurality of IMUs, a predetermined position of each of the first plurality of IMUs and a predetermined orientation of each of the first plurality of IMUs.

In some implementations, the first object is configured to calculate (608), using the controller (e.g., controller 300), a first object current absolute position using an output of the IMU and the first object initial absolute position. For example, as shown in FIG. 5B, the first car 502-1 may calculate the current absolute position of the first car 502-1 to be XX Latitude and YY+10 m Longitude, using an output of the IMU 200-1 and the first car 502-1 initial absolute position by, for example, summing the output of the IMU with the latitude and longitude coordinate data.

In some implementations, the first object is configured to receive (610), using the wireless transceiver (e.g., communication interface 214), referential data from the second object. In some implementations, the referential data includes an second object current absolute position calculated using a second plurality of IMUs associated with the second object. For example, as shown in FIG. 5C, the referential data of the second car 502-2 may include the current absolute position of the second car 502-2 calculated using a second plurality of IMUs associated with the second car 500-2.

In some implementations the first object is configured to calculate (612) a relative position of the first object relative to the second object using the first object current absolute position and the second object current absolute position. In some implementations, the relative position includes at least one of: (i) a distance between the first object and the second object and (ii) an orientation of the first object relative to the second object. For example, as shown in FIG. 5D, the first car 502-1 may determine, based on the referential data received from the second car 502-2 shown in FIG. 5C, the distance between the first car 502-1 and the second car 502-2 to be 2 meters.

In some implementations, the first object uses a radio communication signal to calculate (e.g., using radiometry) estimated distance of the first object relative to the second object. In some implementations, the distance measurement includes at least one of: (i) a distance measurement between the first object and the second object, by the first object, (ii) a distance measurement between the first object and the second object, by the second object that is relayed through data transmission, using the wireless transceiver, from the second object to the first object, and (iii) a distance measurement between the first object and the second object, by the second object that is relayed through data transmission, using the wireless transceiver, from the first object to the second object. In some implementations, one or more of such measurement methods are used independently for overall rectified relative position estimation. In some implementations, one or more of such measurements are used in communication with IMU rectified output to eliminate error in the device network.

In some implementations, the referential data from the second object includes a third object current absolute position of a third object calculated using a third plurality of IMUs associated with the third object. The first object is configured to calculate a relative position of the first object relative to the third object using the first object current absolute position and the third object current absolute position. The relative position includes at least one of: (i) a distance between the first object and the third object, (ii) an orientation of the first object relative to the third object. For example, as shown in FIG. 5C, a mesh network may be created such that the third car 502-3 may send the referential data of the third car 502-3 to the second car 502-2 and the second car 502-2 may send the referential data of the third car 502-3 to the first car 502-1. The referential data of the third car 502-3 may include the current absolute position of the third car 502-3 calculated using a third plurality of IMUs 200-3 associated with the third car 502-3.

In some implementations, the first plurality of IMUs generate the motion signal using at least one of: shape correction, static calibration, motion decomposition, dynamic calibration, motion synthesis, and edge condition smoothing.

In some implementations, the controller contains additional sensors for other internal and/or environmental conditions which typically includes automobile sensors, such as temperature sensors, GPS. In some implementations, additional sensor data is transmitted by the controller using the wireless transceiver in independent data packets or included in the data packets with the reference signal.

In some implementations, the first object is a first car and the second object is a second car, the method further comprising: after calculating a relative position of the first car relative to the second car, determining whether the relative position of the first car to the second car meets emergency criteria; and in response to determining that the relative position of the first car to the second car meets emergency criteria, causing the first car to perform an evasive maneuver, wherein the evasive maneuver includes braking the first car and/or turning the first car. For example, with reference to FIGS. 5A-5D, the second car 502-2 may be swerving towards the first car 502-1, such that the first car 502-1 and second car 502-2 may collide at some point in the future. In response, the drift free sensor system 200-1 may either alert the driver and/or cause the first car 502-1 to perform an evasive maneuver, wherein the evasive maneuver includes braking the first car and/or turning the first car 502-1 to avoid the second car 502-2.

In some implementations, the first object is further configured to display, at a user interface associated with the first object, a position of the first object on a graphical representation of a map using the relative position of the first object relative to the second object. For example, with reference to FIGS. 5A-5D, the drift free sensor system 200-1 may display a position of the car 502-1 on the graphical representation of the map using the relative position of the first object relative to the second object.

Some implementations use the device-related information described above (e.g., device identifier, device characteristics, manual or autonomous operation, static or dynamic object, on/off state, etc.) in calculating and/or displaying positions, velocities, and/or orientations of the objects.

In some implementations, the first object is a home appliance and the second object is a car. The home appliance is configured to, after calculating a relative position of the car relative to the home appliance, determine whether the relative position of the car to the home appliance meets operational state change criteria; and, in response to determining that the relative position of the car to the home appliance meets operational state change criteria, cause the home appliance to change from an off state to an on state.

Position/Location Measurement Summary

The position/location measurement and tracking technology described above with reference to FIGS. 1A-6 (hereinafter referred to as ROMOS) provides high precision and high accuracy position data using a fully functional drift-free inertial motion sensor; a goal that has eluded scientists for over twenty (20) years. ROMOS delivers drift-free orientation and position data to connected components such as microcontrollers and microprocessors.

ROMOS has proven applications such as Navigation, Indoor Tracking, Robotics, and Vehicle to X (V2X) successfully employing its high definition location tracking. When used in navigation applications, ROMOS enabled devices can track vehicles in the complete absence of GPS signal(s); a feat thought to be impossible by the leading technology companies. Where GPS may provide location accuracy within three (3) to ten (10) meters, ROMOS provides position resolution in millimeters. Furthermore, ROMOS is a local module embedded on the tracking device, operating without external signals. This mode of operation to produce location information prevents spoofing. An external device cannot pretend to send bad location data to the device being tracked. The inherent security and accuracy of ROMOS makes it ideal for GEOS Decentralized Applications as it provides the foundational high-resolution location data needed for Proof of Location (PoL), Spoofing Prevention, and Blockchain integration equipped with data privacy and security.

ROMOS provides accurate location of indoor & underground areas. GPS signals cannot penetrate underground or inside tunnels, making satellite-based tracking of traditional IMUs impossible. ROMOS does not rely on satellites and can function on its own to track objects independent of any other external reference signals. This means ROMOS can track objects underground with the same accuracy as it can any object above ground. Control stations receive updates ten times a second, making ROMOS faster and more accurate than GPS.

ROMOS can track distances of moving objects or nodes in an interconnected mesh network with precision, accuracy, and redundancy. An object can be a car, cellphone, mobile device, stationary light-pole, etc. More objects create more redundancy, making the technology more fail-safe. If some nodes fail, the remaining mesh network takes over and compensates. ROMOS can function independently or in conjunction with transponders introducing network redundancy and fail-safe.

In some implementations, GEOS and/or ROMOS Mesh Networks utilize one or more of the following technologies for communication and radiometric measurements: GPS, Bluetooth/BLE, WiFi, Cellular, LPWAN, RFID, NFC, and/or LoRa.

The above mentioned radiometric techniques employed in Geospatial applications may be less accurate and serve as a method of identifying a region for localized occurrences rather than a precise location of a given event. Spatiotemporal fusion between two or more radiometric measurement techniques helps better predict the regional location of events. Furthermore, radiometric methods are prone to hacking and spoofing attacks.

By fusing high accuracy ROMOS data with radiometric techniques, the location error is reduced to a few millimeters enabling high accuracy and high precision identification of event location. Therefore, ROMOS enabled devices operating in radiometric field networks are immune to hacking and spoofing.

Geospatial Operating System (GEOS)

GEOS is a decentralized ecosystem, akin to an Operating System (OS) for blockchain, designed to provide a single trustless and secure platform, focused on Smart City implementations using downstream Decentralized Applications (dAPPs).

In order for GEOS to function as a core technology layer for other dAPPs to interact with, some fundamental shortfalls in traditional blockchain technologies must be solved. For instance, 51% Attack is a vulnerability of Bitcoin blockchain, generally attributed to Proof-of-Work (PoW) based validation of mining nodes. It is worth noting, PoW consensus algorithm suffers from latency, rendering it inadequate as a validation method for fast-paced blockchain implementations, such as Smart Cities, autonomous vehicles, robotics, navigation, etc. Similarly, Proof-of-Stake (PoS), while offering better performance, suffers from potential centralization as the network evolves.

Recently, few attempts have been made to develop a new paradigm for node validation known as Proof-of-Location (PoL). Prior attempts at using PoL in blockchain have suffered from three persistent problems; a) Lack of Accuracy and Precision of location; b) Spoofing; and c) Connectivity. Furthermore, only radiometric methods such as GPS/GNSS, Bluetooth, WiFi, etc. have been employed with telemetric algorithms to provide a basis for generating inferred location data with significant margins or errors. Use of intrinsic motion sensors such as Inertial Measurement Units (IMUs) would be ideal to reduce error margins; however, IMUs cannot provide long-term sustained location information due to the persistent drift problems with such devices.

Drift can be explained as the difference between the location where an IMU thinks it is and where it is actually located. Drift is a compounding error and it continuously increases over time, caused by factors such as noise, sampling error, algorithmic errors, etc. Consumer grade IMUs can drift up to 7,800 kilometers per hour and marine grade IMUs can drift up to 1.8 kilometers per day. Conventional IMUs are inadequate for IoT applications requiring sustained position tracking.

Additionally, the ecosystem of interconnected IoT devices in prior distributed application attempts have been overburdened with multiple device types with a myriad of processing protocols that are unique to each type of device, with workarounds engineered in an effort to circumvent communication restrictions of such devices and lack of network availability. Most of all, these attempts have been unsuccessful, lacking purpose and an endpoint for Location Based Services (LBS), operating in an isolated domain only to accrue tokens, without tangible benefits to quality of life.

ROMOS is an improved intrinsic motion measurement technology based on a new paradigm of IMU sensors, and it opens the door to otherwise inaccessible realms of PoL solutions. These IMU sensors do not suffer from drift, allowing high-density, millimeter-level, measurements in movement. Being intrinsic in operation, ROMOS does not depend on any external signal to measure motion and provides long-term sustained accuracy and precision output of motion data. One of the significant benefits of PoL generated by ROMOS' localized motion sensing technology is that its signal cannot be spoofed. Spoofing is the primary vulnerability that can lead to 51% attacks for radio based devices using telemetric techniques, where a false radio signal can be generated to fool a network of nodes.

ROMOS technology may be optimized for blockchain applications as it comes with interconnectivity and a mesh network of nodes that are capable of true, peer-to-peer, decentralized communication over radio using networks such as Bluetooth, WiFi, LoRa, and/or Cellular Networks, including 5G. In this manner, a ROMOS device may a) broadcast its own intrinsic location measurement provided by the motion sensor;
b) broadcast telemetric data about its neighboring ROMOS enabled and non-ROMOS radiometric devices; and
c) have its own radiometric positioning advertised by all neighboring ROMOS enabled and non-ROMOS enabled radiometric devices.

The triple consensus is live and works continuously for all nodes in the mesh network. Proof-of-Location for any given node is achieved if a consensus exists between:

its own intrinsic location opinion and
a majority consensus of its telemetric positioning calculated by neighboring nodes in the mesh network.

The key to network level spoof prevention is the ability for any node to have an opinion of its own location; a feature that has eluded all other attempts at PoL in the past.

New nodes joining the network receive an initial minimum trust ranking ($T_i$). By providing veritable proof-of-presence data, the new node gains trust while accruing tokens; such that a given new node, called Node N, must achieve above a threshold of trust ($T_t$) before other nodes within the network can independently rely on data from node N. Additionally, the notion of 100% trust does not exist within the network for any given node.

$$T_i < T_t <= T_r < 100\% \quad \text{(eq 1)}$$

In contrast to PoW blockchain applications such as Bitcoin, which is vulnerable to a 51% malicious attack, and which operates on less than a ratio of 1:99 distributed blockchain nodes versus wallet addresses, GEOS is 100% distributed and decentralized with zero percent vulnerability to malicious attacks. GEOS takes advantage of cross correlating the physical location of a node versus their advertised location.

$$\text{If } L_p \neq L_a \text{ then } T\downarrow \quad \text{(eq 2)}$$

$$\text{If } L_p = L_a \text{ then } T\uparrow \quad \text{(eq 3)}$$

Where $L_p$ is the physical location and $L_a$ is the advertised location, while T is Trust.

In general, where location data is concerned, spoofing involves a method by which a network can be fooled in to thinking that a device is in an advertised location; whereas, the device is truly in another physical location. Additionally, in conventional blockchain networks, more than 50% bad devices can corrupt the network by spoofing or falsely advertising their location. If a node advertises any number of spoofed locations in the network, the true physical location calculated by surrounding neighbors is used to identify the location discrepancy and demote that device out of the network.

Let X=physical location of spoofing device $D_x$
Let A=spoofed Location 1 by device $D_x$
Let B=spoofed Location 2 by device $D_x$
Let C=spoofed Location 3 by device $D_x$
Let T=Trust ranking of device $D_x$ $$\text{If } X \neq A \text{ or } B \text{ or } C \text{ then } T\downarrow \quad \text{(eq 4)}$$

Physical location is a determinant of common consensus formed by other trustworthy neighbor nodes above the threshold $T_t$ within the mesh network; whereas, Advertised location is the node's opinion of its own location relative to other nodes within the network, made possible by ROMOS.

The seamless application of the logic described above is possible because of the integration of high accuracy precision of ROMOS technology within the network. See FIGS. 7 and 8.

Figure 7:
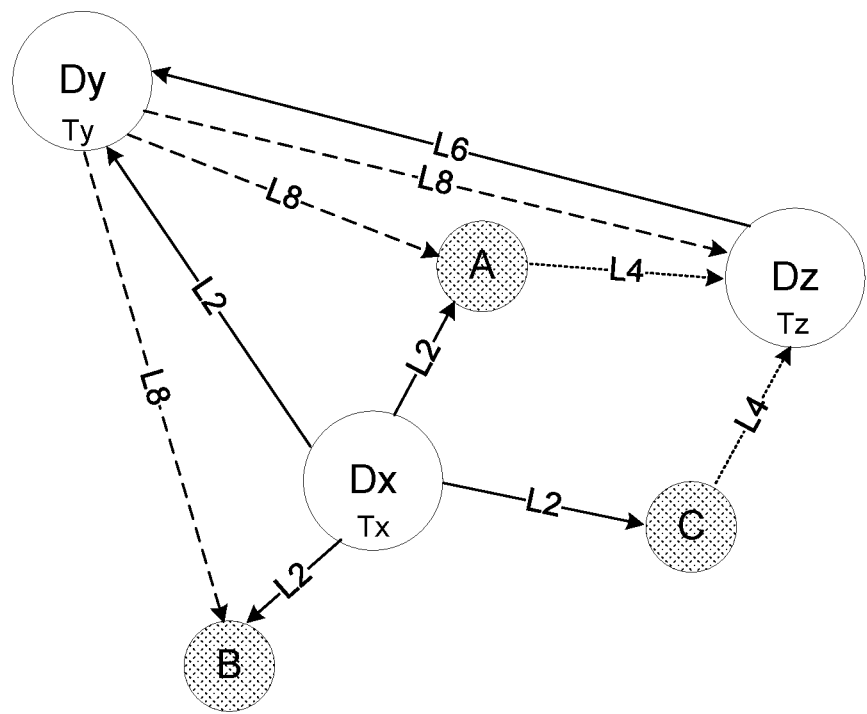
FIG. 7 depicts an example peer-to-peer network of connected devices in which a location of a first device Dx is determined by other devices in the network in accordance with some implementations.

Referring to FIG. 7, a first device (Dx) in the peer-to-peer network performs an intrinsic location measurement (i) using a plurality of inertial measurement units (IMUs) of the first device and (ii) independent of data obtained from devices in the peer-to-peer network other than the first device; and broadcasts to one or more devices (Dy, A, B, C) in the peer-to-peer network first location information of the first device (L2) based on the intrinsic location measurement.

A second device (Dy) in the peer-to-peer network receives from the first device (Dx) in the peer-to-peer network the first location information (L2) of the first device (Dx); receives from a third device (Dz) in the peer-to-peer network second location information (L6) of the first device (Dx), the second location information (L6) of the first device (Dx) having been determined by the third device (Dz) based on location information (L4) received from at least one device (A, C) in the peer-to-peer network other than the first device (Dx); and compares the first location information (L2) of the first device (Dx) with the second location information (L6) of the first device (Dx).

In accordance with a determination that the first location information (L2) of the first device (Dx) matches the second location information (L6) of the first device (Dx), the second device (Dy) increases a trust factor (Tx) associated with the first device (Dx); and broadcasts to one or more devices (Dz, A, B) in the peer-to-peer network (i) the increased trust factor (Tx) associated with the first device (Dx), and (ii) consensus location information (L8) of the first device (Dx) based on the first location information (L2) of the first device (Dx).

In accordance with a determination that the first location information (L2) of the first device (Dx) does not match the second location information (L6) of the first device (Dx), the second device (Dy) decreases a trust factor (Tx) associated with the first device (Dx); and broadcasts to one or more devices (Dz, A, B) in the peer-to-peer network (ii) the decreased trust factor (Tx) associated with the first device (Dx), and (ii) consensus location information (L8) of the first device based on the second location information (L6) of the first device (Dx).

In some implementations, performing the intrinsic location measurement at the first device includes determining (as described above with reference to FIGS. 1A-6) a first device initial absolute position for the plurality of IMUs; sensing, using the plurality of IMUs, motion of the first device and generating sensed motion data of the first device; generating, using a controller of the first device, a motion signal representative of the motion of the first device, including calculating a rectified data output based on sensed motion data from each of the plurality of IMUs, a predetermined position of each of the plurality of IMUs, and a predetermined orientation of each of the plurality of IMUs; and determining, using the controller, the intrinsic location measurement based on the motion signal generated by the controller and the first device initial absolute position.

In some implementations, a trust factor (Tz) of the third device (Dz) is a basis on which other devices (Dy) in the peer-to-peer network weigh the broadcasted consensus location (L6) of the first device (Dx).

In some implementations, a trust factor (Tx) associated with the first device (Dx) is a basis on which other devices (Dy, A, B, C) in the peer-to-peer network weigh the first location information (L2) broadcasted by the first device (Dx).

In some implementations, respective devices of the peer-to-peer network perform one or more of the aforementioned operations using respective proof of location modules 280.

Figure 8:
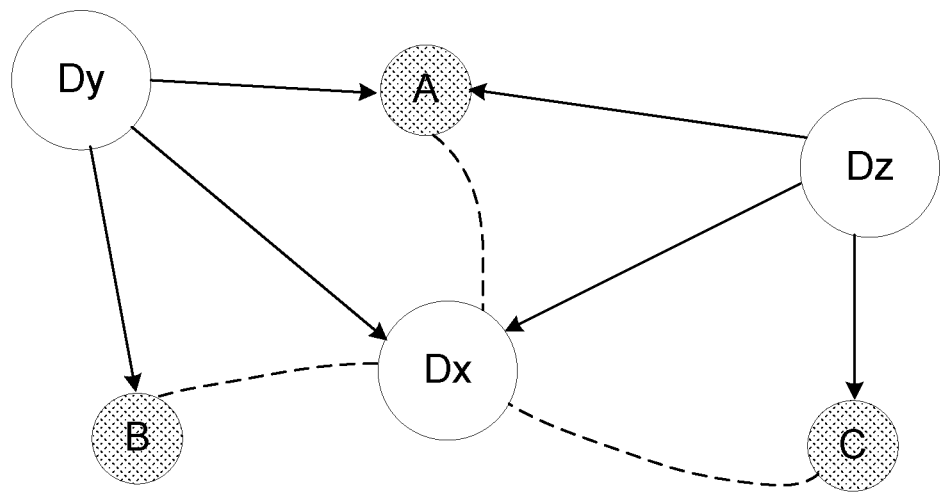
FIG. 8 depicts an example peer-to-peer network of connected devices in accordance with some implementations, in which location data may or may not be spoofed.

Referring to FIG. 8, Node Dx attempts to fake its location as false nodes A, B, C. Nodes Dy and Dz can only verify location of Dx, recognizing that Dx is a spoofing node. More specifically:

Dy and Dz are Trusted Nodes, where $T_r > T_r$—Verified location by Trusted Nodes—Matching Advertised & Physical Location.

Dx is a Spoofing Node, where $T_r < T_r$—Verified location by Trusted Nodes—Wrong Advertised Location, T↓

A, B, and C are Spoofed Nodes, where $T_r < T_r$—Cannot be verified by Trusted Nodes—Wrong Physical Location, T<1

Geocoding

Conventional Geohash is a method of encoding a two dimensional (2D) geographical location reference, Longitude and Latitude, in a readable text format. The Base32 text generated by Geohash is a hierarchical encoding, where prefixes can be used to correlate objects occupying a given geospatial region of interest. GEOS blockchain, however, uses a three dimensions (3D) to identify a location or region on the globe (Longitude, Latitude, and Altitude). In addition, GEOS location data is received in high resolution from ROMOS devices and mesh-network with millimeter level precision. As such, conventional Geohash is insufficient to hold GEOS location data.

In order to properly encode geospatial data, GEOS uses a 3D hash including Longitude, Latitude, and Altitude in a base64 encoding format named GEOSHASH. Using base64 encoding reduces the length of the GEOSHASH string; further optimizing storage of location data on the blockchain. Additionally, the relational hierarchy or regions remains intact with GEOSHASH, making search queries for devices in a shared region faster.

The CN-Tower in Toronto is located at −79.3871° Longitude and 43.6426° Latitude with a height of 1.815 km and an altitude of 0.080 km above sea level. A point at the top of the tower will be situated at an altitude of 1.895 km.

A standard Geohash with base32 encoding generates a 2D hash without altitude information. GEOS' base64 encoding method termed Geo-Spherical Hash (GEOSHASH-64) generates a 3D hash including altitude information. Altitude is encoded with a range of −1000 km to +1000 km vertically with respect to the sea-level; encompassing 10× greater altitude than height of the upper atmosphere (100 km), well into the Low Earth Orbit. In this manner, satellites can also be tracked to a millimeter precision using GEOSHASH. Encoding a 3D-GEOSHASH in base32 format leads to a 66% increase in the length of the hash string; whereas, using base64 encoding leads to only a 22% increase to accommodate altitude data GEOS Operating System GEOS is implemented on a high security hybrid-blockchain with a distributed blockchain-database redundancy. Effectively, two mechanisms of storage; a) Blockchain; and b) BlockchainDB concurrently store data generated by dAPPs. Using BlockchainDB provides an additional benefit of key-pair generation for IoT device identifiers (DID). Data fields of the blockchain transactions may be written to the block in plain text. These key-pair values are used by the GEOS blockchain to encrypt private data components written to GEOS blockchain, increasing security and anonymity of the system. Another benefit to using a concurrent BlockchainDB is the increased speed of data retrieval. Moreover, in rare cases of Blockchain Database corruption, the standard blockchain can be used to restore BlockchainDB in a background process with higher latency. In this manner, continuity of the system is maintained during a self-repair phase, if needed, while providing safe redundancy using BlockchainDB.

Figure 9:
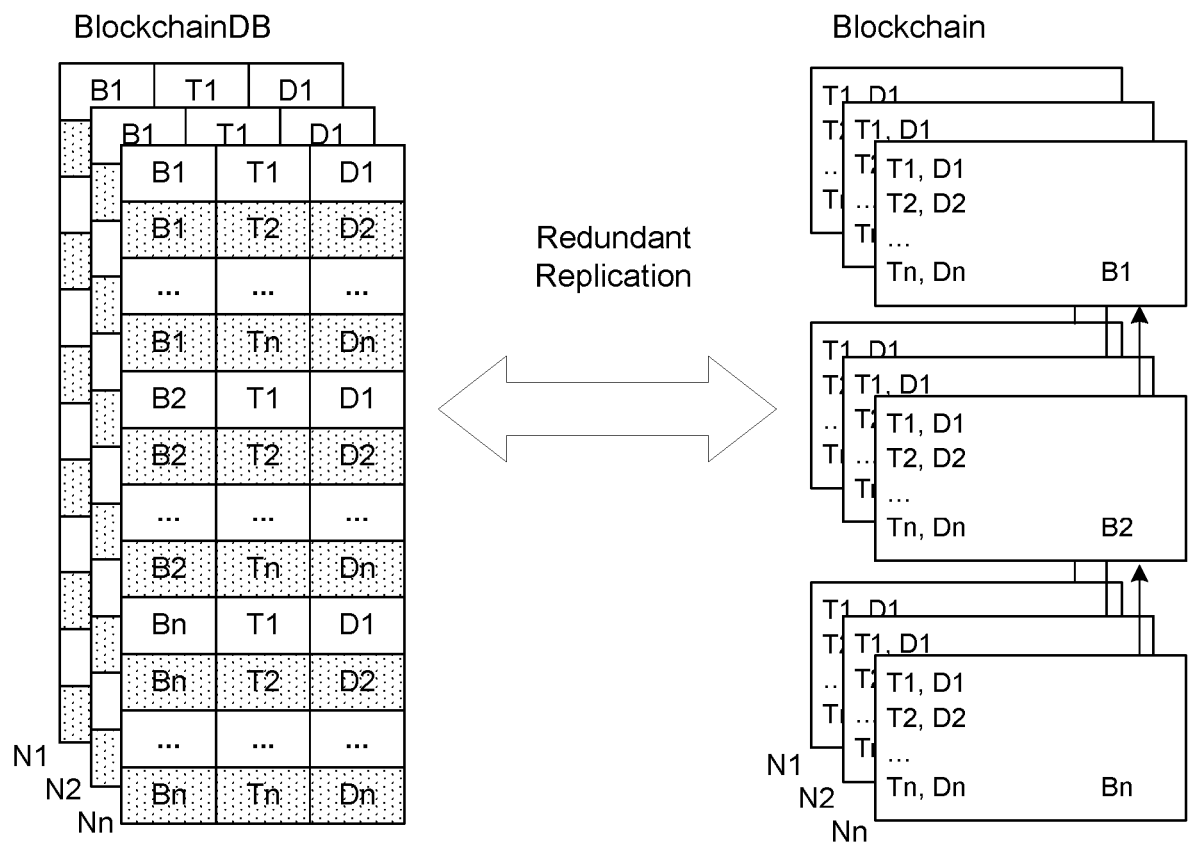
FIG. 9 depicts an example of parallel storage of PoL consensus data in accordance with some implementations.
Figure 10:
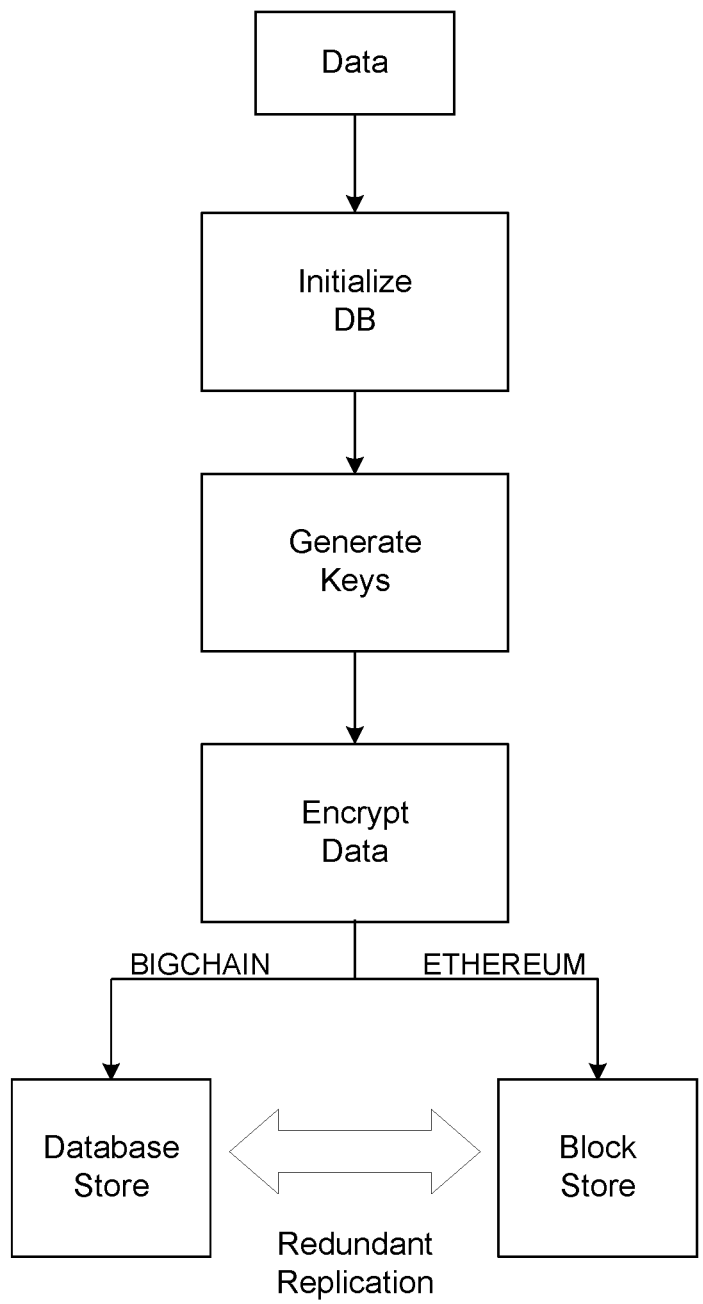
FIG. 10 depicts a flowchart of a method of encrypting and storing PoL consensus data in accordance with some implementations.
Figure 11:
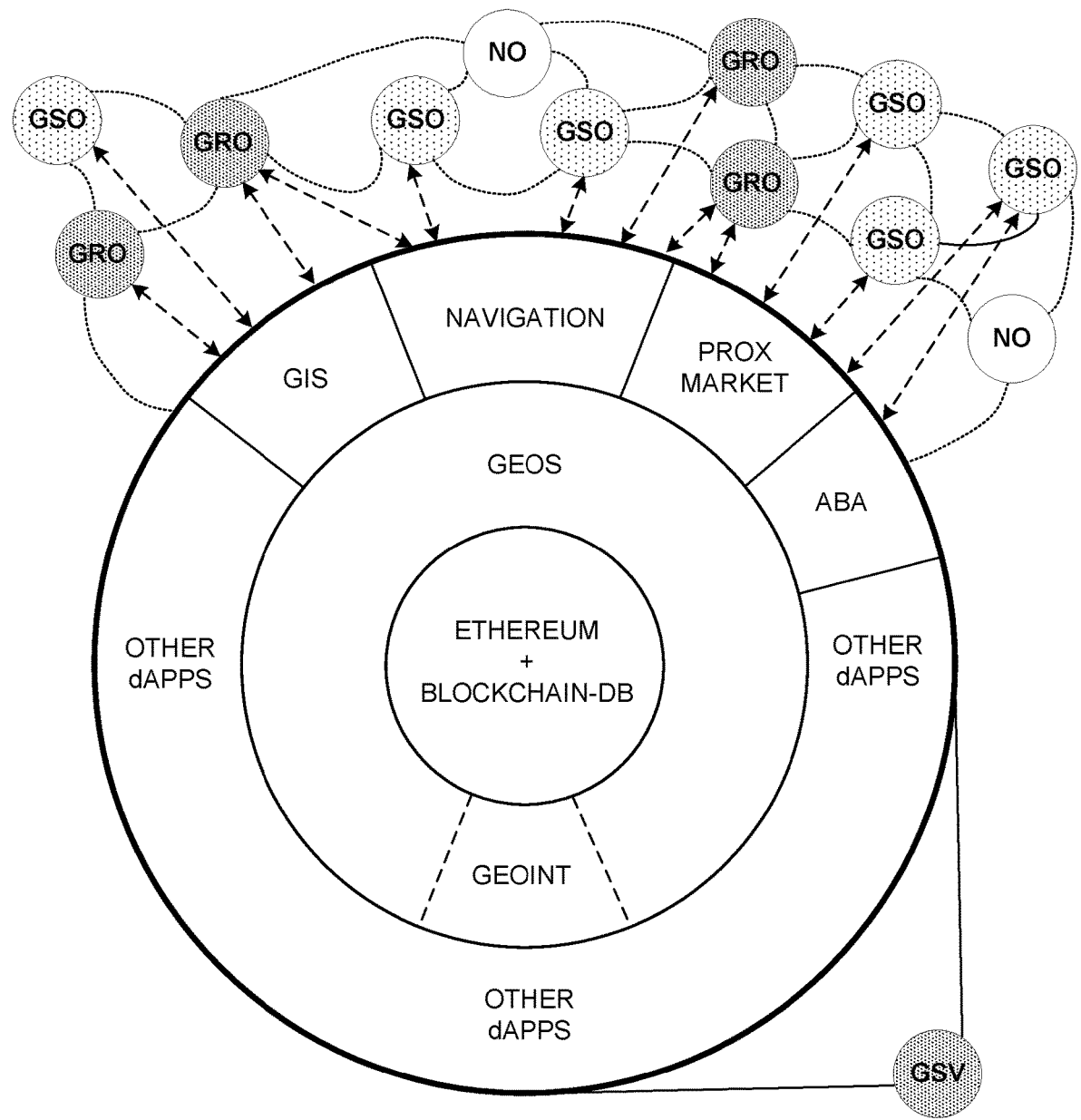
FIG. 11 depicts a geospatial operating system networking environment in accordance with some implementations.

Referring to FIG. 9, a simplified diagram of Blockchain Database format (left) and Blockchain format (right) illustrates a mechanism of parallel data storage. Blockchain remains immutable and can be used to self-heal errors in Blockchain Database. BlockchainDB provides ultra-fast access to information. Both mechanisms of storage are replicable on each node in the Blockchain network. The example illustrated in FIG. 9 shows data as if it were replicated on Ethereum and Blockchain Database simultaneously.

Prior to creation of transactions, blocks, or distributed database records, public and private keys are created for connected dAPPs, users, and devices in order to encrypt private data prior to storage. Private information can only be decrypted by the data owner, while publicly declared data will be stored in plain-text within the decentralized database record and blockchain. See FIG. 10, which illustrates data flow in GEOS storage architecture with encryption key generation, data encryption, and data replication on Ethereum and Blockchain Database simultaneously.

GEOS is designed with a built-in Geospatial Intelligence module, commonly known as GEOINT, at the heart of its kernel. GEOS is the first system to provide a fully decentralized Geospatial Intelligence in an OS platform. By incorporating GEOINT into the GEOS architecture, any connected dAPP can easily and securely access the intelligent analytics with fast response to query provided by GEOS.

GEOS wraps Ethereum Blockchain and Blockchain Database while abstracting highly secure and accurate proof-of-location, data encryption, artificial intelligence, data-redundancy, and blockchain transaction features for downstream dAPPs through a robust application programming interface (API). Developers can focus on application specific programming, while GEOS handles Blockchain Database and Ethereum transactions with an added benefit of the uniquely fast PoL provided by ROMOS mesh-network technology. See FIG. 11, which illustrates GEOS system architecture with Ethereum and Blockchain Database core wrapped by GEOS Operating System with built-in GEOINT artificial intelligence module. Connected dAPPs interact with GEOS via APIs. Future dAPPs can be added as the ecosystem grows. GSOs, GROs, GSVs of the GEOS network contain the GEOS system GEOS Ecosystem GEOS is a true distributed and decentralized ecosystem comprising (and in some implementations, consisting of only) three entities or device-types. Currently, separation between device-types is necessary due to the hardware specifications of embedded IoT field devices, arising out of the limits imposed by available processing speed and memory.

GEOS Soft (GSOs) Nodes: GSOs are devices that, in some implementations, do not have (or have less than all of the components of) ROMOS high accuracy position tracking hardware. Soft nodes are activated by downloading a ROMOS kernel that operates in a background process, and participates in PoL functions on the network, by providing higher accuracy location data, than default methods such as GPS or Cell Networks alone.

GEOS ROMOS Enabled (GROs) Nodes: GROs are devices that have ROMOS high accuracy position tracking hardware embedded. dAPPs can interact with Location Based Services (LBS) provided by the hardware on GROs. PoL is highly optimized in these devices. Memory, processing speed, communication channels are subject to the specification of the host device. GROs may have less memory capacity or processing speed than GSVs.

GEOS ROMOS Enabled Server (GSV) Nodes: GSVs are devices that have ROMOS high accuracy position tracking hardware embedded. GSVs also have high capacity memory capable of storing Blockchain Databases and Blockchains indefinitely. GSVs may be server type or mobile devices.

Non-GEOS (NO) Devices: Tech devices that have communication capability, but do not contain ROMOS high accuracy position tracking technology, remain outside the "Official Ecosystem" of GEOS in some implementations. However, based on the radiometric methods and sophisticated peer detection algorithm, a GSO, GRO, and GSV may identify and locate such non-GEOS devices with a higher degree of accuracy than possible without the ROMOS technology. In some implementations, only GEOS or ROMOS enabled nodes will be able to see NON-GEOS nodes, outside of the mainstream mesh network with a higher precision. No trust value is assigned to NON-GEOS devices. Decentralized Applications (dAPPs): Similar in function as Ethereum is to Blockchain, GEOS is to Smart City dAPPs that provides a foundational layer with a highly secure PoL abstraction. GEOS demonstrates its functionality by introducing a unique GEOINT that becomes an intelligent information manager and processor for downstream dAPPs such as Navigation, GIS, Proximity Marketing, etc. within the decentralized Smart City network.

Ethereum & Database Integration: GEOS blockchain operating system provides API based access to downstream dAPPs. Through its robust API protocols, GEOS handles low-level blockchain transactions and smart contracts with Ethereum and database transactions with Blockchain Database.

Figure 12:
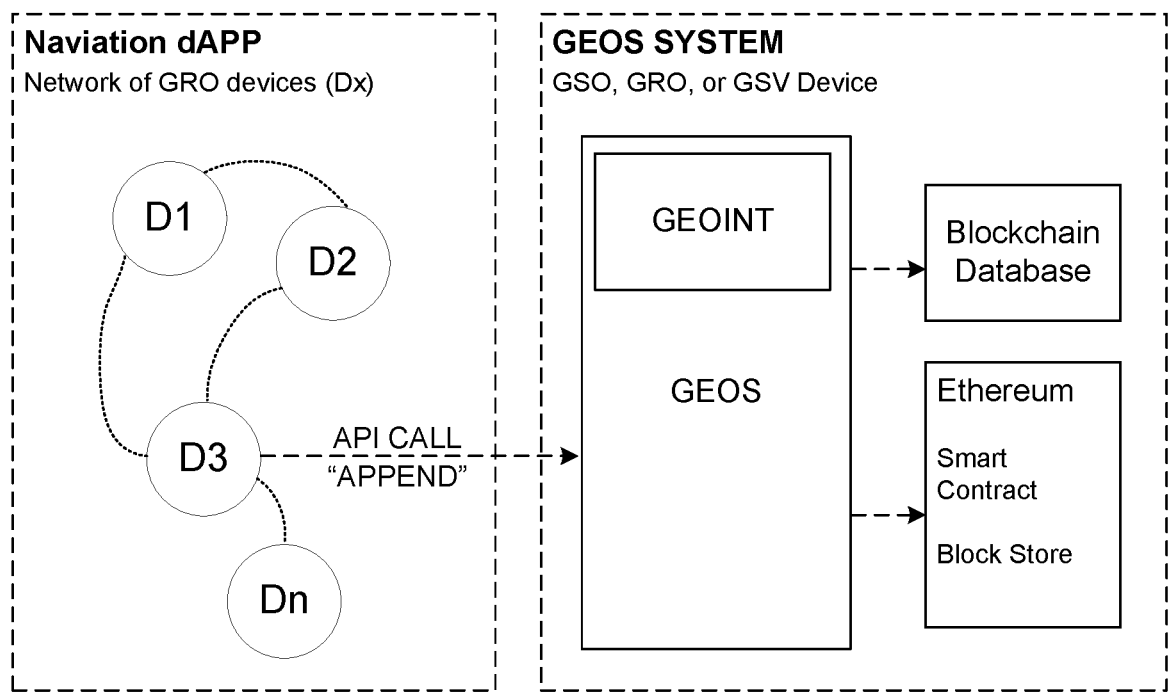
FIG. 12 depicts a geospatial operating system networking environment including an API call in accordance with some implementations.
Figure 13:
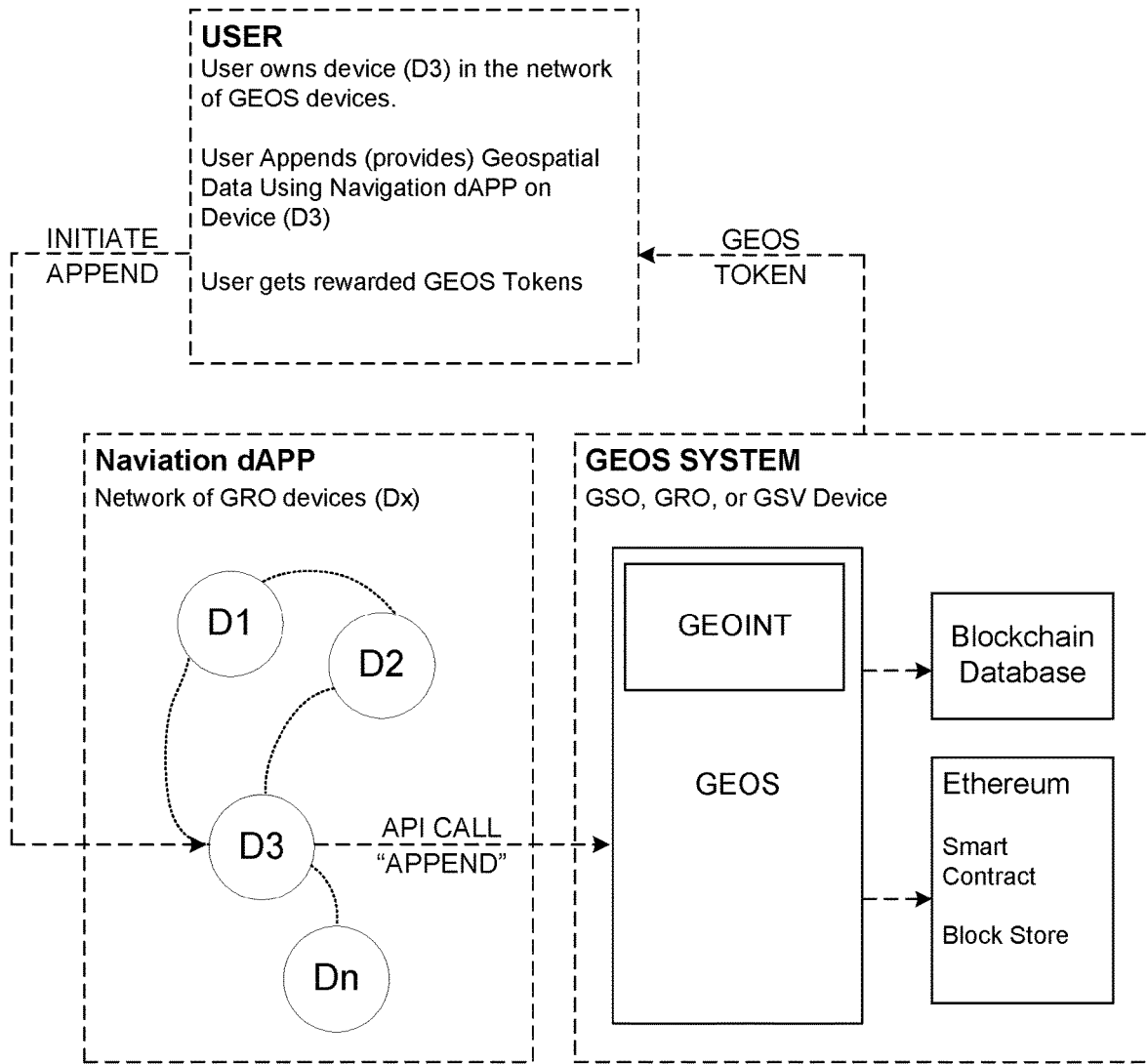
FIG. 13 depicts a geospatial operating system networking environment including an API call and a token reward in accordance with some implementations.

FIG. 12 illustrates an API based "APPEND" transaction initiated from a GRO data generator (D3) in a Navigation dAPP network of field devices. Once an API call is received, GEOS handles storage and smart contract generation with Ethereum for the received data. The communication shown in FIG. 12 is an example of an API based communication between a field device D3 and GEOS. Device D3 issues an "APPEND" API call with new data to GEOS that in-turn manages Ethereum Smart Contracts, storage, and Blockchain Database transactions.

Tokenomics

GEOS token provides value and powers the GEOS ecosystem. Tokens are generated and exchanged through location data sharing, dAPP activity, and strategic partner programs. GEOS tokens incentivize Users to engage with the GEOS network. ERC20 token on the Ethereum Network may be used in the GEOS ecosystem. Additionally or alternatively, GEOS may be migrated to GEOS native blockchain and GEOS users may be rewarded at a one-to-one (1:1) ratio (or any other ratio) with new GEOS tokens.

Device nodes using dAPPs on the GEOS, that contribute meaningful data for other users and devices on the network, may be rewarded tokens.

In some implementations, data transmitted between nodes and GEOS is anonymous and encrypted. GEOS dAPPs will allow data generators to control the level of detail provided to the blockchain network. Once a user chooses to cease data sharing, GEOS rewards are also paused until the User re-enables data sharing. In some implementations, users are in full control of their own data.

The total supply of GEOS tokens was calculated based on current market conditions and future projections of User adoption rate, as well as growth projections of GEOS platform-related industries. With GEOS dAPPs spanning from navigation, proximity marketing, GIS, ABA, and other future dAPPs, ten (10) billion tokens are viewed as the optimal number of tokens to build the GEOS ecosystem. Users will be rewarded with GEOS tokens while contributing spatiotemporal data from application maintainers based on the quality of data generated. Application maintainers will receive rewards through a programmed deflationary token supply.

GEOS tokens are tied to GEOS product usage and will give GEOS Users exclusive access to GEOS dAPPs. The token will be the principal accounting unit and medium of exchange within the GEOS economy. The GEOS network will autonomously distribute rewards and benefits to GEOS Users through PoL and other activities within the ecosystem. Users are rewarded for building and participating in the network, as well as time commitment, activity, and device usage. See FIG. 13, which illustrates an example implementation of the GEOS system issuing tokens to users who are owners of data generator devices in the GEOS ecosystem.

Users may be rewarded GEOS tokens based on their level of involvement within the ecosystem. GEOS nodes, defined above, may be divided into a plurality of (e.g., four) categories, each receiving different reward amounts. In some implementations:

(i) entry tier GEOS nodes, GSOs, receive 1G unit of reward;
(ii) a second tier GEOS nodes, GROs, that have embedded ROMOS hardware and are capable of high-accuracy and high-precision location data generation, receive 1.5G units of reward;
(iii) a third tier GEOS nodes, GSVs, also containing ROMOS hardware, in addition to higher processing and data storage capacity, receive 2G units of reward; and
(iv) non-GEOS devices are detectable by the GEOS network through radiometric methods, but do not participate directly in the blockchain network and are not eligible for the reward program.

By permitting nodes to graduate in tier levels, this allows a smooth transition to better hardware over time while incentivizing Users to own GEOS enabled devices.

In some implementations, when trusted users and nodes share location data within the GEOS network, they may be rewarded fractions of GEOS tokens. Blocks will be created and rewards will be calculated at a floating rate dependent on the growth-rate of the GEOS ecosystem. Rewards will be calculated based on the number of tokens in circulation in comparison to the total amount of data points created within the ecosystem. This mechanism creates incentive for Users to join the network early and benefit from a higher reward value. As the GEOS ecosystem expands and dAPPs are introduced into the network, overall usage of the token and network will also impact the reward value.

GEOS Connected dAPPs

GEOS allows partners and community developers to build dAPPs on the GEOS Operating System. The GEOS operating system may be bundled with initial or starter dAPPs that provide functional utility for users and demonstrate the power of its robust API in real-life decentralized applications built on the platform. Bundled dAPPs may include; i) Terrestrial Navigation System; ii) Proximity Based Marketing; iii) Geospatial Information System; and/or iv) Activity Based Analysis. Each dAPP may use code and data libraries created during development of other dAPP(s). The bundled dAPPs may share commonalities in geospatial data.

The Terrestrial Navigation and Mapping System is a dAPP configured to operate without a GPS signal. The TNM application provides a crowd-sourced and reward incentivized navigation tool with precise three-dimensional directions for uninterrupted indoor and outdoor navigation and mapping for mobile device users. The navigation application is powered by the GEOS network and/or ROMOS technology creating a mapping experience with no single point of failure, equipped with accurate, precise and live data.

Indoor and outdoor tracking solutions typically rely on some form of radio beacon or GPS, susceptible to noise and signal degradation, making it difficult to track objects accurately and consistently. A deterrent to using radio-based indoor tracking solutions is that it requires pre-mapping of buildings to function. Radiometric tracking methods such as beacons depend on multiple devices to coordinate information in order to achieve meaningful signal fusion, adding multiple points of failure to the system. Any failed devices will degrade the system accuracy further.

With the advent of ROMOS technology, however, indoor and outdoor navigation and mapping are highly accurate out-of-the-box, without the need for pre-mapping. Since the tracking sensor is intrinsic within ROMOS, there is no dependence of external radio signals, including GPS, making devices with embedded ROMOS technology more accurate and dependable to track. In addition, ROMOS based hardware is self-contained, independent of other devices in the network, avoiding multiple points of failure typically found in positioning systems today.

As an overall system comparison, some navigation and mapping applications may have the following characteristic limitations: (i) Centralized location databases, (ii) Occasional inaccurate location data, (iii) Lag or delay in mapping updates, (iv) Points of interest (POI) that can be spoofed by BOTs, and (v) Traffic convergence that leads to congestion.

GEOS TNM works on a decentralized platform with live, automatic data updates from devices running the navigation dAPP on the GEOS network filtering out inaccurate data continually and immediately. For outdoor mapping and navigation, points of interest are updated by users and/or Artificial Intelligence features of GEOINT with a strong PoL rejection of false data points. GEOINT can also predict traffic convergence and redirect flow intelligently to avoid congestion. In some implementations, users of GEOS navigation dAPP may be rewarded for following directions provided by GEOS terrestrial navigation system.

Connected TNM dAPP with ROMOS technology is also ideal for autonomous vehicle applications requiring high accuracy position tracking while traveling on a pathway. Detection of fast and precise, millimeter-level changes to autonomous vehicle's position aids the vehicle's onboard artificial intelligence unit in making rapid decisions accurately, reducing the time-to-response of the vehicle significantly.

Proximity Based Marketing (PBM) is a method of connecting products or services with potential customers through advertisement on electronic devices within proximity of the business' locale. PBM is an application that depends on technologies such as Location Based Services (LBS). The ubiquitous and exponential growth of smart technologies such as wearable devices, cell phones, tablets, and smart cars are thrusting opportunities for companies to increase engagement of buyers with beneficial products and services.

Implementations described herein combine demographic and consumer behavior data to evaluate performance. As the market is expected to be driven by the high demand for personalized PBM, development of better applications is on the rise. Location-based ads make use of the user's present and past location details along with other contextual information to predict and display advertisements that match consumer needs, increasing sales.

One obstacle for the growth of PBM is user concern over data privacy. GEOS Proximity Based Marketing dAPP enhances the capability of companies to sell individualized merchandise through the use of the PBM dAPP and built-in GEOINT feature with data security. For this reason, PBM dAPP, by default, use anonymous location data. Users may opt-in to share more detailed consumer statistics for which they will be rewarded additional GEOS tokens. GEOS PBM users may also choose to opt-out of Proximity Based advertisements completely; however, may forfeit the opportunity to collect additional GEOS tokens and incentives from strategic partners. Nevertheless, advertising to anonymous users still enables businesses to interact with consumers directly. Users may be given the capability to set customized preferences within the dAPP, one of which will be to select preferred businesses from whom to receive notifications or advertisements. GEOS tokens can also be redeemed by businesses in exchange for discounts during purchases.

An added bonus is that businesses effectively increases revenue by cutting advertising costs while realizing benefits by exchanging GEOS tokens, not only for a potential customer, but also for valuable location data applied to consumer behavior analysis by the company.

Geographic Information System (GIS) is a process including capturing, encoding, storing, and/or visually representing geospatial data based on user defined queries. GEOS leverages its advanced GEOINT enabled core to power the next generation of GIS decentralized applications. The native artificial intelligence feature of GEOS provides a strong basis for more advanced GIS dAPPs with the added benefit of ROMOS high accuracy data sources. GEOS GIS application provide live data updates at an unprecedented rate, taking minutes as opposed to weeks or months with conventional GIS processes and applications.

GEO databases may be infrequently updated, and they may consist of centralized, limited data. As demand for technology and geospatial data grows rapidly, the segmented and incomplete data will continue to create a bottleneck if innovation in the GIS field lags.

Some of the primary challenges faced within the GIS field today are similar to the challenges of GIS systems: (i) High costs of applications are a deterrent against adopting GIS to optimize operations, (ii) GIS systems are challenged with incorporating traditional surveys, maps, and data, (iii) GIS system that experiences internal "outage" can take hours or days to recover, (iv) Data structures within different GIS systems are notoriously incompatible, (v) Complex data makes simulation and some forms of data analysis difficult to perform, (vi) GIS analysis lacks micro-level details that could impact the overall analysis process, (vii) GIS data volume and required storage is enormous compared to other forms of data types, and (viii) Data collection is costly and may become redundant.

Such complex challenges within conventional GIS architecture are solved by GEOS GIS decentralized application. The GIS dAPP uses vector data for the most compact file sizes, reducing processing, storage, and retrieval burdens on the system. Vector data also results in more precise scaling, leading to better interpolative and extrapolative analysis of geospatial information. Analysts may engage in better predictive models and decision making overall.

GIS application demand is growing and continues to be a necessity as urbanization becomes more dominant. Implementations such as Smart Cities may be viewed as 'living organisms' requiring a complete anatomical study on a regular basis. Users of GEOS GIS may be rewarded for adding geospatial features to the platform and sharing geospatial data, allowing Smart City implementations to function with increasing optimization as more GIS data is accumulated.

GEOS ABA extends the static and dynamic geospatial data generated by TNM, PBM, and GIS dAPPs by leveraging the GEOINT feature of GEOS operating system as a highly tenuous and intelligent analysis tool. Users or groups may analyze live or historical spatiotemporal data via a user interface (UI) or low-level structured queries using GEOS API. The ABA dAPP renders analysis of movement behaviors, state changes, underlying patterns quickly and accurately enabling users to test scenarios and models for an optimized outcome of any given set of input parameters.

In some implementations, GEOS ABA takes advantage of the innovative and optimized platform provided by GEOS operating system and GEOINT, thereby outperforming conventional activity based analysis tools. Following are the limitations of conventional centralized ABA systems: (i) ABA is new and rapidly evolving with no standardized models or frameworks; (ii) Published models are difficult to port or replicate; (iii) Current models require tremendous data for setup, testing, calibration, and updates; (iv) Big data is necessary, but typically difficult to acquire for setup and updates; (v) Damaged, unstructured data, can negatively affect analysis and outcome; and (vi) Spatial data is not standardized and poses a challenge to current ABA models.

GEOS ABA consolidates and creates a standard framework for ABA with portability for other GIS, ABA, or CAD systems. Geospatial data may be provided by TNM, PBM, and GIS dAPPs in vector format for use by the ABA dAPP reducing the burdens in setup, testing, calibration and updates. With GEOINT and ROMOS technology, any low-density or missing geospatial data can be enhanced. GEOS operating system is designed with redundancy in mind and any damaged data can also be restored by swapping data from parallel storage methods of BlockchainDB and Ethereum.

GEOS Benefits

Security officials can utilize the GEOS dAPP to better understand daily congestive patterns to effectively apply crowd management for cities. Police can analyze crime patterns of particular areas to reduce response times, increase probability of preventing crimes within a city.

First Responders can utilize the GEOS dAPP to identify the exact location of individuals at risk. In a fire emergency, rescue personnel can determine the exact floor levels and rooms that are occupied by people in danger. In combination with the indoor navigation dAPP, first responders can instantly plan out rescue paths. Additionally, a rescue team entering a hazardous area can be tracked by stationary back-up support units outside the building.

Law enforcement's application of the GEOS ABA dAPP allows law enforcement to gain a better predictive perspective of locations with a higher probability of crime based on historical activity of criminals or crimes that have taken place in a specific area of a city. Predictive policing refers to the usage of mathematical, predictive analytics, and other analytical techniques in law enforcement to identify potential criminal activity. Predictive policing methods fall into four general categories: methods for predicting crimes, methods for predicting offenders, methods for predicting perpetrators' identities, and methods for predicting victims of crime.

Location data paired with other smart technology, such as a smart watch or fitness band, allows healthcare providers to better understand a patient's health history and overall mobility, fitness and wellness. Understanding the mobility of a patient or gaining insight from ABA allows patients to make better fitness decisions and reach mobility milestones.

Gaining a better understanding of urban crowd flow to specific areas of a city allows the city to readjust water flow to the more concentrated areas, reducing leakage and water waste. With more climate awareness and changes in the global ecosystem, water is becoming a more valuable commodity. Better managed water consumption and water flow allows greater water conservation and water source maintenance.

The GEOS dAPP can assist waste management to productively and efficiently remove waste on greater scales. Understanding the activity of a city allows waste management to accelerate waste removal and provide a healthier and cleaner habitat for a city's population.

The GEOS ABA dAPP deliver insight to developers and city planners in better understanding the most optimal placement of businesses and housing to deliver the most economic benefit to a greater city.

GEOS Network with the high-precision and high-accuracy ROMOS tracking technology can revolutionize autonomous driving, traffic control, logistics scheduling, and public transport.

Advanced activity-based analysis allows citizens to interact and interface with their city on a greater scale.

Miscellaneous

In the foregoing description, reference is made in detail to implementations, examples of which are illustrated in the accompanying drawings. Also, in the foregoing detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first electronic device could be termed a second electronic device, and, similarly, a second electronic device could be termed a first electronic device, without departing from the scope of the various described implementations. The first electronic device and the second electronic device are both electronic devices, but they are not necessarily the same electronic device.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A method of determining locations of devices in a peer-to-peer network, comprising:
   at a first device (Dx) in the peer-to-peer network:
      performing an intrinsic location measurement (i) using a plurality of inertial measurement units (IMUs) of the first device (Dx) and (ii) independent of data obtained from devices in the peer-to-peer network other than the first device; and
      broadcasting to a first one or more devices (Dy, A, B, C) in the peer-to-peer network first location information (L2) of the first device (Dx) based on the intrinsic location measurement; and
   at a second device (Dy) in the peer-to-peer network:
      receiving from the first device (Dx) in the peer-to-peer network the first location information (L2) of the first device (Dx);
      receiving from a third device (Dz) in the peer-to-peer network second location information (L6) of the first device (Dx), the second location information (L6) of the first device (Dx) having been determined by the third device (Dz) based on location information (L4) received from at least one device (A, C) in the peer-to-peer network other than the first device (Dx);
      comparing the first location information (L2) of the first device (Dx) with the second location information (L6) of the first device (Dx);
      in accordance with a determination that the first location information (L2) of the first device (Dx) matches the second location information (L6) of the first device (Dx):
         increasing a trust factor (Tx) associated with the first device (Dx); and
         broadcasting to a second one or more devices (Dz, A, B) in the peer-to-peer network (i) the increased trust factor (Tx) associated with the first device (Dx), and (ii) consensus location information (L8) of the first device (Dx) based on the first location information (L2) of the first device (Dx); and in accordance with a determination that the first location information (L2) of the first device (Dx) does not match the second location information (L6) of the first device (Dx):
decreasing the trust factor (Tx) associated with the first device (Dx); and
broadcasting to the second one or more devices (Dz, A, B) in the peer-to-peer network (ii) the decreased trust factor (Tx) associated with the first device (Dx), and (ii) consensus location information (L8) of the first device (Dx) based on the second location information (L6) of the first device (Dx).

2. The method of claim 1, wherein performing the intrinsic location measurement at the first device includes:
determining a first device initial absolute position for the plurality of IMUs;
sensing, using the plurality of IMUs, motion of the first device (Dx) and generating sensed motion data of the first device (Dx);
generating, using a controller of the first device (Dx), a motion signal representative of the motion of the first device (Dx), including calculating a rectified data output based on sensed motion data from each of the plurality of IMUs, a predetermined position of each of the plurality of IMUs, and a predetermined orientation of each of the plurality of IMUs; and
determining, using the controller, the intrinsic location measurement based on the motion signal generated by the controller and the first device initial absolute position.

3. The method of claim 1, wherein a trust factor (Tz) of the third device (Dz) is a basis on which other devices (Dy) in the peer-to-peer network weigh the broadcasted consensus location (L6) of the first device (Dx).

4. The method of claim 1, wherein the trust factor (Tx) associated with the first device (Dx) is a basis on which other devices (Dy, A, B, C) in the peer-to-peer network weigh the first location information (L2) broadcasted by the first device (Dx).

5. The method of claim 1, wherein each device in the peer-to-peer network includes parallel data storage, including:
database storage configured to store location information of devices in the peer-to-peer network and trust factors of devices in the peer-to-peer network in a database format; and
block storage configured to store the location information of devices in the peer-to-peer network and the trust factors of devices in the peer-to-peer network in a blockchain format.

6. The method of claim 1, wherein devices of the peer-to-peer network are configured to provide application programming interface (API) access to downstream distributed applications, including, for a given device in the peer-to-peer network, issuing an append API call with new location information for other devices in the peer-to-peer network.

7. The method of claim 1, wherein a given device of the peer-to-peer network receives reward tokens based on:
validation of device location information transmitted by the given device, including matching by devices in the peer-to-peer network other than the given device (i) the device location information transmitted by the given device with (ii) consensus location information for the given device determined by the devices other than the given device;
validation of device location information transmitted by the devices other than the given device, including matching by the given device (i) the device location information transmitted by the devices other than the given device with (ii) consensus location information for the devices other than the given device determined by the given device;
a capability of the given device to perform intrinsic location measurements (i) using a plurality of IMUs of the given device and (ii) independent of data obtained from the devices other than the given device; and/or
a capability of the given device to provide consensus location information processing for device location information received by the devices other than the given device.

8. A system for determining locations of devices in a peer-to-peer network, the system comprising:
a first device (Dx) including a controller, a wireless transceiver, and a plurality of inertial measurement units (IMUs);
a second device (Dy) including a controller and a wireless transceiver; and
a third device (Dz) including a controller and a wireless transceiver;
wherein the first device (Dx) is configured to:
perform an intrinsic location measurement (i) using the plurality of inertial measurement units (IMUs) of the first device (Dx) and (ii) independent of data obtained from devices in the peer-to-peer network other than the first device; and
broadcast to a first one or more devices (Dy, A, B, C) in the peer-to-peer network first location information (L2) of the first device (Dx) based on the intrinsic location measurement; and
wherein the second device (Dy) is configured to:
receive from the first device (Dx) in the peer-to-peer network the first location information (L2) of the first device (Dx);
receive from the third device (Dz) in the peer-to-peer network second location information (L6) of the first device (Dx), the second location information (L6) of the first device (Dx) having been determined by the third device (Dz) based on location information (L4) received from at least one device (A, C) in the peer-to-peer network other than the first device (Dx);
compare the first location information (L2) of the first device (Dx) with the second location information (L6) of the first device (Dx);
in accordance with a determination that the first location information (L2) of the first device (Dx) matches the second location information (L6) of the first device (Dx):
increase a trust factor (Tx) associated with the first device (Dx); and
broadcast to a second one or more devices (Dz, A, B) in the peer-to-peer network (i) the increased trust factor (Tx) associated with the first device (Dx), and (ii) consensus location information (L8) of the first device (Dx) based on the first location information (L2) of the first device (Dx); and
in accordance with a determination that the first location information (L2) of the first device (Dx) does not match the second location information (L6) of the first device (Dx):
decrease the trust factor (Tx) associated with the first device (Dx); and broadcast to the second one or more devices (Dz, A, B) in the peer-to-peer network (ii) the decreased trust factor (Tx) associated with the first device (Dx), and (ii) consensus location information (L8) of the first device (Dx) based on the second location information (L6) of the first device (Dx).

9. The system of claim 8, wherein the first device is configured to:
   determine a first device initial absolute position for the plurality of IMUs;
   sense, using the plurality of IMUs, motion of the first device (Dx) and generating sensed motion data of the first device (Dx);
   generate, using a controller of the first device (Dx), a motion signal representative of the motion of the first device (Dx), including calculating a rectified data output based on sensed motion data from each of the plurality of IMUs, a predetermined position of each of the plurality of IMUs, and a predetermined orientation of each of the plurality of IMUs; and
   determine, using the controller, the intrinsic location measurement based on the motion signal generated by the controller and the first device initial absolute position.

10. The system of claim 8, wherein a trust factor (Tz) of the third device (Dz) is a basis on which other devices (Dy) in the peer-to-peer network weigh the broadcasted consensus location (L6) of the first device (Dx).

11. The system of claim 8, wherein the trust factor (Tx) associated with the first device (Dx) is a basis on which other devices (Dy, A, B, C) in the peer-to-peer network weigh the first location information (L2) broadcasted by the first device (Dx).

12. The system of claim 8, wherein each device in the peer-to-peer network includes parallel data storage, including:
   database storage configured to store location information of devices in the peer-to-peer network and trust factors of devices in the peer-to-peer network in a database format; and
   block storage configured to store the location information of devices in the peer-to-peer network and the trust factors of devices in the peer-to-peer network in a blockchain format.

13. The system of claim 8, wherein devices of the peer-to-peer network are configured to provide application programming interface (API) access to downstream distributed applications, including, for a given device in the peer-to-peer network, issuing an append API call with new location information for other devices in the peer-to-peer network.

14. The system of claim 8, wherein a given device of the peer-to-peer network is configured to receive reward tokens based on:
   validation of device location information transmitted by the given device, including matching by devices in the peer-to-peer network other than the given device (i) the device location information transmitted by the given device with (ii) consensus location information for the given device determined by the devices other than the given device;
   validation of device location information transmitted by the devices other than the given device, including matching by the given device (i) the device location information transmitted by the devices other than the given device with (ii) consensus location information for the devices other than the given device determined by the given device;
   a capability of the given device to perform intrinsic location measurements (i) using a plurality of IMUs of the given device and (ii) independent of data obtained from the devices other than the given device; and/or
   a capability of the given device to provide consensus location information processing for device location information received by the devices other than the given device.

15. A non-transitory computer-readable storage medium storing one or more programs, the one or more programs comprising instructions, which when executed by (i) a first device (Dx) including a controller, a wireless transceiver, and a plurality of inertial measurement units (IMUs), (ii) a second device (Dy) including a controller and a wireless transceiver, and (iii) a third device (Dz) including a controller and a wireless transceiver, cause the first, second, and/or third devices to:
   at the first device (Dx) in the peer-to-peer network:
      perform an intrinsic location measurement (i) using a plurality of inertial measurement units (IMUs) of the first device (Dx) and (ii) independent of data obtained from devices in the peer-to-peer network other than the first device; and
      broadcast to a first one or more devices (Dy, A, B, C) in the peer-to-peer network first location information (L2) of the first device (Dx) based on the intrinsic location measurement; and
   at the second device (Dy) in the peer-to-peer network:
      receive from the first device (Dx) in the peer-to-peer network the first location information (L2) of the first device (Dx);
      receive from a third device (Dz) in the peer-to-peer network second location information (L6) of the first device (Dx), the second location information (L6) of the first device (Dx) having been determined by the third device (Dz) based on location information (L4) received from at least one device (A, C) in the peer-to-peer network other than the first device (Dx);
      compare the first location information (L2) of the first device (Dx) with the second location information (L6) of the first device (Dx);
      in accordance with a determination that the first location information (L2) of the first device (Dx) matches the second location information (L6) of the first device (Dx):
         increase a trust factor (Tx) associated with the first device (Dx); and
         broadcast to a second one or more devices (Dz, A, B) in the peer-to-peer network (i) the increased trust factor (Tx) associated with the first device (Dx), and (ii) consensus location information (L8) of the first device (Dx) based on the first location information (L2) of the first device (Dx); and
      in accordance with a determination that the first location information (L2) of the first device (Dx) does not match the second location information (L6) of the first device (Dx):
         decrease the trust factor (Tx) associated with the first device (Dx); and
         broadcast to the second one or more devices (Dz, A, B) in the peer-to-peer network (ii) the decreased trust factor (Tx) associated with the first device (Dx), and (ii) consensus location information (L8)

of the first device (Dx) based on the second location information (L6) of the first device (Dx).

16. The non-transitory computer-readable storage medium of claim 15, wherein the one or more programs further comprise instructions for causing the first device to perform the intrinsic location measurement by performing the following steps:
- determining a first device initial absolute position for the plurality of IMUs;
- sensing, using the plurality of IMUs, motion of the first device (Dx) and generating sensed motion data of the first device (Dx);
- generating, using a controller of the first device (Dx), a motion signal representative of the motion of the first device (Dx), including calculating a rectified data output based on sensed motion data from each of the plurality of IMUs, a predetermined position of each of the plurality of IMUs, and a predetermined orientation of each of the plurality of IMUs; and
- determining, using the controller, the intrinsic location measurement based on the motion signal generated by the controller and the first device initial absolute position.

17. The non-transitory computer-readable storage medium of claim 15, wherein a trust factor (Tz) of the third device (Dz) is a basis on which other devices (Dy) in the peer-to-peer network weigh the broadcasted consensus location (L6) of the first device (Dx).

18. The non-transitory computer-readable storage medium of claim 15, wherein the trust factor (Tx) associated with the first device (Dx) is a basis on which other devices (Dy, A, B, C) in the peer-to-peer network weigh the first location information (L2) broadcasted by the first device (Dx).

19. The non-transitory computer-readable storage medium of claim 15, wherein each device in the peer-to-peer network includes parallel data storage, including:
- database storage configured to store location information of devices in the peer-to-peer network and trust factors of devices in the peer-to-peer network in a database format; and
- block storage configured to store the location information of devices in the peer-to-peer network and the trust factors of devices in the peer-to-peer network in a blockchain format.

20. The non-transitory computer-readable storage medium of claim 15, wherein devices of the peer-to-peer network are configured to provide application programming interface (API) access to downstream distributed applications, including, for a given device in the peer-to-peer network, issuing an append API call with new location information for other devices in the peer-to-peer network.

* * * * *